US011888555B2

United States Patent
Mungara et al.

(10) Patent No.: US 11,888,555 B2
(45) Date of Patent: Jan. 30, 2024

(54) METHOD TO BEAMFORM MULTICAST TRANSMISSION

(71) Applicant: Telefonaktiebolaget LM Ericsson (publ), Stockholm (SE)

(72) Inventors: Ratheesh Kumar Mungara, Sundbyberg (SE); Sairamesh Nammi, Kista (SE); Jörg Huschke, Cologne (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/784,828

(22) PCT Filed: Dec. 11, 2020

(86) PCT No.: PCT/EP2020/085854
§ 371 (c)(1),
(2) Date: Jun. 13, 2022

(87) PCT Pub. No.: WO2021/116461
PCT Pub. Date: Jun. 17, 2021

(65) Prior Publication Data
US 2023/0010083 A1 Jan. 12, 2023

Related U.S. Application Data

(60) Provisional application No. 62/948,012, filed on Dec. 13, 2019.

(51) Int. Cl.
*H04B 7/0456* (2017.01)
(52) U.S. Cl.
CPC ................... *H04B 7/0456* (2013.01)

(58) Field of Classification Search
CPC ... H04L 5/0048; H04L 5/0023; H04L 5/0053; H04L 5/0051; H04L 5/0057; H04L 5/005;
(Continued)

(56) References Cited

U.S. PATENT DOCUMENTS 10,383,120 B2 * 8/2019 Kuo .................... H04B 7/0632
2008/0316099 A1 12/2008 Fujii
(Continued)

FOREIGN PATENT DOCUMENTS

| CN | 102265524 A | 11/2011 |
|---|---|---|
| WO | 2018236866 A1 | 12/2018 |
| WO | 2019158189 A1 | 8/2019 |

OTHER PUBLICATIONS

International Search Report and Written Opinion dated May 18, 2021 for International Application No. PCT/ EP2020/085854 filed Dec. 11, 2020, consisting of 19 pages.
(Continued)

*Primary Examiner* — Eva Y Puente
(74) *Attorney, Agent, or Firm* — Christopher & Weisberg, P.A.

(57) ABSTRACT

A method, system and apparatus are disclosed. According to one or more embodiments, a network node is provided. The network node includes processing circuitry configured to receive channel state information, CSI, from each of a plurality of wireless devices and determine at least one null space based on the received CSI from each of the plurality of wireless devices. The processing circuitry is further configured to determine a common precoding matrix index, PMI, where a common beamforming vector is not in the at least one null space and cause a multicast broadcast transmission to the plurality of wireless devices using at least the common PMI.

25 Claims, 14 Drawing Sheets

(58) Field of Classification Search
CPC ............ H04L 1/0026; H04L 25/03343; H04B 7/0456; H04B 7/0626; H04B 7/0639; H04B 7/0417; H04B 7/0452; H04B 7/0617; H04B 7/0632; H04B 7/024; H04W 72/23; H04W 72/20; H04W 72/02; H04W 72/044; H04W 72/543; H04W 72/566; H04W 76/14; H04W 84/005
USPC ........................................................ 375/267
See application file for complete search history.

(56) References Cited

U.S. PATENT DOCUMENTS

| | | | |
|---|---|---|---|
| 2019/0182697 A1* | 6/2019 | Zhang | .................. H04W 16/28 |
| 2019/0313459 A1 | 10/2019 | Zhang et al. | |
| 2019/0341978 A1* | 11/2019 | Ibrahim | ................ H04B 7/061 |
| 2022/0159674 A1* | 5/2022 | Deng | ................. H04W 72/566 |

OTHER PUBLICATIONS

Maattanen et al. "Sum Rate Maximizing Zero Interference Linear Multiuser MIMO Transmission" 2012 IEEE 75th Vehicular Technology Conference (VTC Spring); May 2012, consisting of 5 pages.

Chinese Office Action and English Summary dated Oct. 21, 2023 for Application No. 202080096531.9, consisting of 9 pages.

Yu et al. "Multi-user Network Analysis of BC Unicast and BC Multicast Coexistence" School of Information Engineering, Shanghai Maritime University; vol. 45 No. 10; Oct. 2018, consisting of 5-pages.

* cited by examiner

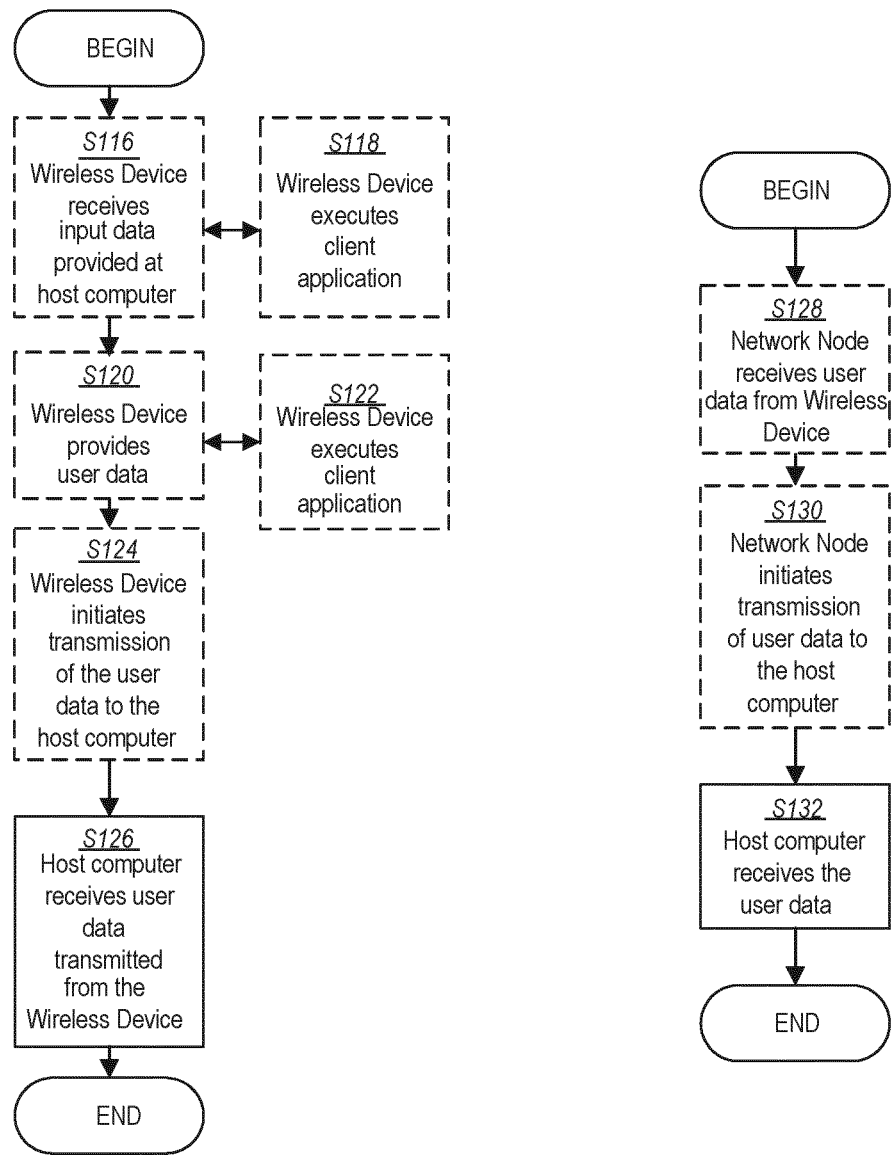

METHOD TO BEAMFORM MULTICAST TRANSMISSION

CROSS-REFERENCE TO RELATED APPLICATIONS

This application is a Submission Under 35 U.S.C. § 371 for U.S. National Stage Patent Application of International Application No.: PCT/EP2020/085854, filed Dec. 11, 2020 entitled "A METHOD TO BEAMFORM MULTICAST TRANSMISSION," which claims priority to U.S. Provisional Application No. 62/948,012, filed Dec. 13, 2019, entitled "A METHOD TO BEAMFORM NR MULTICAST TRANSMISSION," the entireties of both of which are incorporated herein by reference.

TECHNICAL FIELD

The present disclosure relates to wireless communications, and in particular, to beamforming broadcast or multicast of the traffic channel.

BACKGROUND

To help meet the growing demand for data centric applications, Third Generation Partnership Project (3GPP) extended the 4th generation (4G, also referred to as Long Term Evolution (LTE)) standards to $5^{th}$ Generation (5G) (5G is also referred to as New Radio (NR)) access. The following may be useful for 5G networks:

Data rates of several tens of megabits per second may be supported for a large number of wireless devices such as for tens of thousands of wireless devices;
1 gigabit per second data rates may be offered simultaneously to various wireless devices on the same office/building floor;
Several hundreds of thousands of simultaneous connections may be supported for massive sensor deployments;
Spectral efficiency may be significantly enhanced compared to 4G;
Coverage may be improved;
Signaling efficiency may be enhanced;
Latency may be reduced significantly compared to LTE.

In general, Multiple-Input Multiple-Output (MIMO) systems can significantly increase the data carrying capacity of wireless systems. For at least this reason, MIMO is an integral part of the 3rd and 4th generation wireless systems, i.e., 3G and 4G. 5G systems may also employ MIMO systems also called massive MIMO systems (hundreds of antennas at the Transmitter side and/Receiver side). Given (Nt,Nr), where Nt denotes the number of transmit antennas and Nr denotes the receive antennas, the peak data rate multiplies with a factor of Nt over single antenna systems in a rich scattering environment.

Message Sequence Chart for Downlink Data Transfer

FIG. 1 is a diagram of a messaging sequence chart for downlink data transfer in 5G systems. From the pilot or reference signals, the wireless device computes the channel estimates and then computes the parameters needed for Channel State Information (CSI) reporting. The CSI report may consist of, for example, channel quality indicator (CQI), precoding matrix index (PMI), rank indicator (RI), CSI-RS Resource Indicator (CRI—the same as a beam indicator), etc.

The CSI report is sent to the network node via a feedback channel on request from the network node, or the wireless device may be configured to report periodically and/or aperiodically. The scheduler of the network node uses the information in the CSI report to select/determine the parameters for scheduling of the wireless device associated with the CSI report. The network node transmits the scheduling parameters to the wireless device in the downlink control channel. After that actual data transfer takes place from network node to the wireless device.

Downlink Reference Signals

Downlink reference signals are predefined signals occupying specific resource elements within the downlink time-frequency grid. There are several types of downlink reference signals that are transmitted in different ways and used for different purposes by the receiving wireless device. For example:

CSI reference signals (CSI-RS): These reference signals may be intended to be used by wireless devices to acquire channel-state information and beam specific information (beam relative signal receive power, RSRP). In wireless communication systems such as 5G, CSI-RS is wireless device specific such that this reference signal type may have a significantly lower time/frequency density when compared to other reference signal types.

Demodulation reference signals (DM-RS): These reference signals may be referred to as wireless device-specific reference signals, and may be intended to be used by wireless device for channel estimation for the data channel. The label "wireless device-specific" may relates to the fact that each demodulation reference signal is intended for channel estimation by a single wireless device. That specific reference signal is then only transmitted within the resource blocks assigned for data traffic channel transmission to the specific wireless device for which it is intended.

Other than these reference signals, there are other reference signals, for example, multicast broadcast single frequency network (MBSFN) and positioning reference signals, that may be used for various purposes which are not relevant for this disclosure and therefore will not be further described.

Uplink Control Channel:

The uplink control channel may carry information about hybrid automatic repeat request (HARQ) ACK information corresponding to the downlink data transmission, and channel state information. The channel state information may include one or more of CRI, RI, CQI, and PMI.

Downlink Control Channel:

The physical downlink control channel (PDCCH) carries information about the scheduling grants. The information may include one or more of a number of MIMO layers scheduled, transport block sizes, modulation for each codeword, parameters related to HARQ. All downlink control information (DCI) formats may not use/transmit all the information described above such that, in general, the contents of PDCCH depends on transmission mode and DCI format.

NR Multicast/Broadcast:

Existing 4G/LTE systems may support broadcast and multicast transmission over a wide area using either single frequency network (SFN) or single-cell point-to-multipoint operating modes which is referred to as MBMS (Multimedia Broadcast Multicast Service). Specifically, in MBSFN, network nodes across multiple cells transmit the same data in the same resource block over special frames dedicated to MBMS service. Alternatively, in single cell point-to-multipoint (SC-PTM), the same data is transmitted to multiple wireless devices in a single cell using the PDSCH. Such broadcast/multicast feature is expected to eventually be supported in 5G NR access technology to support 5G use cases such as for public safety, emergency services, IoT software upgrades, etc.

Existing 5G system are designed assuming NR unicast transmission, where each wireless device sends the CSI to the network node based on the CSI-RS. At the time of scheduling data on the traffic channel, the network node may use this information for the scheduling.

SUMMARY

Some embodiments advantageously provide methods, systems, and apparatuses for beamforming the broadcast of a data channel to multiple wireless devices and/or determining and/or selecting parameters for broadcasting to multiple wireless devices simultaneously.

One or more embodiments described herein provide a method of enabling broadcast and/or multicast transmissions in 5G New Radio (NR), over a certain region or complete coverage area. For example, in one or more embodiments, the network node chooses one common (i.e., for all wireless devices) radio network temporary identifier (RNTI) for transmitting DMRS, PDCCH and PDSCH, while the network node chooses the cell id for transmitting the CSI-RS. Once the network node receives the CSI from each of the wireless devices, the network node may choose the MCS and the correct beamforming vectors or precoders such that the broadcast data is received by all the wireless devices. In this method, the network node helps ensure that a selected beamforming vector is not in the null space of the beamforming vector indicated by the wireless device as part of the CSI report. In one or more embodiments, the network node may send a restriction bit map to each wireless device such that the wireless device sends CQI, and PMI corresponding rank 1 transmission, thereby helping reduce the complexity of selecting the parameters.

One or more embodiments described herein advantageously facilitate multicast transmission for all the wireless devices in the cell while at the same time help reduce the number of retransmissions. Hence, the overall spectral efficiency is improved such as due to less retransmissions being required in response to the multicast. The teachings described herein may be useful when the network node is equipped with massive MIMO systems.

According to one aspect of the disclosure, a method performed by a network node is provided. Channel state information, CSI, is received from each of a plurality of wireless devices. At least one null space is determined based on the received CSI from each of the plurality of wireless devices. A common precoding matrix index, PMI, is determined where a common beamforming vector is not in the at least one null space. A multicast broadcast transmission to the plurality of wireless devices using at least the common PMI is caused.

According to one or more embodiments of this aspect, causing transmission of a non-beamformed CSI-reference signal, CSI-RS, signaling to the plurality of wireless devices is caused. The received CSI from each of the plurality of wireless devices is based on the non-beamformed CSI-RS signaling. According to one or more embodiments of this aspect, the common PMI is determined to allow for a maximum common MCS at which each of the plurality of wireless devices have a block error rate, BLER, below a target BLER.

According to one or more embodiments of this aspect, a restriction is signaled to the plurality of wireless devices where the restriction is configured to limit a rank that is indicatable in the CSI reported by each of the plurality of wireless devices. According to one or more embodiments of this aspect, the rank is limited to rank-1 PMI. Rank 1 PMI is PMI corresponding to rank 1. According to one or more embodiments of this aspect, a plurality of inner products are generated in matrix form of precoders indicated in each CSI received from the plurality of wireless devices. One of a row and column is selected from the matrix that avoids the at least one null space, the common PMI being based on the selected one of the row and column from the matrix.

According to one or more embodiments of this aspect, a common channel quality indicator, CQI, is determined based at least on the CSI received from each of the plurality of wireless devices where the broadcast transmission to the plurality of wireless devices uses at least the common CQI. According to one or more embodiments of this aspect, the CSI received from each of the plurality of wireless devices includes a CQI reported by the wireless device. The common CQI corresponds to a CQI having a minimum index of CQIs reported by the plurality of wireless devices. According to one or more embodiments of this aspect, the common CQI is mapped to an MCS by accounting for resource availability where the MCS corresponds to a common MCS. The broadcast transmission to the plurality of wireless devices uses at least the common MCS.

According to one or more embodiments of this aspect, transmission of beamformed CSI-RS signaling to the plurality of wireless devices is caused. The beamformed CSI-RS signaling is based on the common PMI. Additional CSI is received from each of the plurality of wireless devices based on the beamformed CSI-RS signaling. The determining of the common CQI is further is based at least on the additional CSI, and the broadcast transmission to the plurality of wireless devices uses the common CQI. According to one or more embodiments of this aspect, a common modulation and coding scheme, MCS, is determined based at least on the CSI from each of the plurality of wireless devices where the broadcast transmission to the plurality of wireless devices uses at least the common MCS. According to one or more embodiments of this aspect, the determining of the common MCS based at least on the CSI from each of the plurality of wireless devices includes aggregating CQIs in the CSIs from the plurality of wireless devices, and mapping the aggregated CQI to an MCS that corresponds to the common MCS.

According to one or more embodiments of this aspect, the determining of the common MCS based at least on the CSI from each of the plurality of wireless devices includes mapping CQIs in the CSIs from the plurality of wireless devices to a plurality of MCSs, and aggregating the plurality of MCSs to an MCS that corresponds to the common MCS. According to one or more embodiments of this aspect, a plurality of inner products are generated in matrix form of precoders indicated in each CSI received from each of the plurality of wireless devices. A determination is made that more than one row from the matrix corresponds to the inner product is greater than 0. A scaling factor is used to estimate a resulting received signal power at each of the plurality of wireless devices where the common PMI is based on the estimate of the resulting received signal power at each of the plurality of wireless devices.

According to one or more embodiments of this aspect, the scaling factor associated with the wireless device is an approximate representation of a path gain between the network node and the wireless device. According to one or more embodiments of this aspect, the CSI received from each of the plurality of wireless devices includes a CQI reported by the respective wireless device. The common CQI is mapped to a MCS. Each reported CQI is mapped to a MCS. A common MCS is selected based at least one the mapping of the common CQI and each reported CQI.

According to another aspect of the disclosure, a method performed by a first wireless device is provided. Beamformed channel state information-reference signal, CSI-RS, signaling is received where the beamformed CSI-RS signaling is communicated based on a common precoding matrix index, PMI, that avoids at least one null space associated with a plurality of wireless devices including the first wireless device. A channel quality indicator, CQI, is computed based on the beamformed CSI-RS signaling. The CQI that is based on the beamformed CSI-RS signaling is indicated to a network node.

According to one or more embodiments of this aspect, signaling to report CSI without PMI, in other words to send only CQI as part of the CSI report and indicate CQI is received where the computed CQI being performed based on the signaling. According to one or more embodiments of this aspect, a broadcast transmission that uses the common PMI is received. According to one or more embodiments of this aspect, non-beamformed CSI-RS signaling is received. CSI is computed based on the non-beamformed CSI-RS signaling. The CSI is indicated to the network node for configuring the beamformed CSI-RS signaling using the common PMI.

According to one or more embodiments of this aspect, the CSI indicates at least one of a PMI and MCS reported by the wireless device. According to one or more embodiments of this aspect, the beamformed CSI-RS signaling is communicate using a common MCS that is based on the MCS reported by the wireless device. According to one or more embodiments of this aspect, a restriction configured to limit a rank that is indicatable in the CSI is received. According to one or more embodiments of this aspect, the rank is limited to rank-1 PMI. According to one or more embodiments of this aspect, a data traffic channel that is communicated using a common CQI that is based on the indicated CQI is received.

According to another aspect of the disclosure, a network node is provided. The network node includes processing circuitry configured to receive channel state information, CSI, from each of a plurality of wireless devices, determine at least one null space based on the received CSI from each of the plurality of wireless devices, determine a common precoding matrix index, PMI, where a common beamforming vector is not in the at least one null space, and cause a multicast broadcast transmission to the plurality of wireless devices using at least the common PMI.

According to one or more embodiments of this aspect, the processing circuitry is further configured to cause transmission of a non-beamformed CSI-reference signal, CSI-RS, signaling to the plurality of wireless devices where the received CSI from each of the plurality of wireless devices is based on the non-beamformed CSI-RS signaling. According to one or more embodiments of this aspect, the common PMI is determined to allow for a maximum common MCS at which each of the plurality of wireless device have a block error rate, BLER, below a target BLER. According to one or more embodiments of this aspect, the processing circuitry is further configured to signal a restriction to the plurality of wireless devices where the restriction is configured to limit a rank that is indicatable in the CSI reported by each of the plurality of wireless devices. According to one or more embodiments of this aspect, the rank is limited to rank-1 PMI.

According to one or more embodiments of this aspect, the processing circuitry is further configured to generate a plurality of inner products in matrix form of precoders indicated in each CSI received from the plurality of wireless devices and select one of a row and column from the matrix that avoids the at least one null space where the common PMI is based on the selected one of the row and column from the matrix. According to one or more embodiments of this aspect, the processing circuitry is further configured to determine a common channel quality indicator, CQI, based at least on the CSI received from each of the plurality of wireless devices where the broadcast transmission to the plurality of wireless devices uses at least the common CQI. According to one or more embodiments of this aspect, the CSI received from each of the plurality of wireless devices includes a CQI reported by the wireless device where the common CQI corresponds to a CQI having a minimum index of CQIs reported by the plurality of wireless devices.

According to one or more embodiments of this aspect, the processing circuitry is further configured to map the common CQI to an MCS by accounting for resource availability where the MCS corresponds to a common MCS, the broadcast transmission to the plurality of wireless devices using at least the common MCS. According to one or more embodiments of this aspect, the processing circuitry is further configured to cause transmission of beamformed CSI-RS signaling to the plurality of wireless devices where the beamformed CSI-RS signaling is based on the common PMI. The processing circuitry is further configured to receive additional CSI from each of the plurality of wireless devices based on the beamformed CSI-RS signaling where the determining of the common CQI is further based at least on the additional CSI and where the broadcast transmission to the plurality of wireless devices uses the common CQI. According to one or more embodiments of this aspect, the processing circuitry is further configured to determine a common modulation and coding scheme, MCS, based at least on the CSI from each of the plurality of wireless devices where the broadcast transmission to the plurality of wireless devices uses at least the common MCS.

According to one or more embodiments of this aspect, the determining of the common MCS based at least on the CSI from each of the plurality of wireless device includes aggregating CQIs in the CSIs from the plurality of wireless devices and mapping the aggregated CQI to an MCS that corresponds to the common MCS. According to one or more embodiments of this aspect, the determining of the common MCS based at least on the CSI from each of the plurality of wireless devices includes mapping CQIs in the CSIs from the plurality of wireless devices to a plurality of MCSs, and aggregating the plurality of MCSs to an MCS that corresponds to the common MCS. According to one or more embodiments of this aspect, the processing circuitry is further configured to generate a plurality of inner products in matrix form of precoders indicated in each CSI received from each of the plurality of wireless devices, determine more than one row from the matrix corresponds to the inner product is greater than 0; and use a scaling factor to estimate a resulting received signal power at each of the plurality of wireless devices. The common PMI is based on the estimate of the resulting received signal power at each of the plurality of wireless devices.

According to one or more embodiments of this aspect, the scaling factor is an approximate representation of a path gain between the network node and the wireless device. According to one or more embodiments of this aspect, the CSI received from each of the plurality of wireless devices includes a CQI reported by the respective wireless device. The processing circuitry further configured to map the common CQI to a MCS, map each reported CQI to a MCS and select a common MCS based at least one the mapping of the common CQI and each reported CQI.

According to another aspect of the disclosure, a first wireless device is provided. The first wireless device includes processing circuitry configured to receive beamformed channel state information-reference signal, CSI-RS, signaling where the beamformed CSI-RS signaling is communicated based on a common precoding matrix index, PMI, that avoids at least one null space associated with a plurality of wireless devices including the first wireless device. The processing circuitry is further configured to compute a channel quality indicator, CQI, based on the beamformed CSI-RS signaling, and indicate the CQI that is based on the beamformed CSI-RS signaling to a network node.

According to one or more embodiments of this aspect, the processing circuitry is further configured to receive signaling to report CSI without PMI, in other words to send only CQI as part of the CSI report, the computed CQI being performed based on the signaling. According to one or more embodiments of this aspect, the processing circuitry is further configured to receive a broadcast transmission that uses the common PMI. According to one or more embodiments of this aspect, the processing circuitry is further configured to receive non-beamformed CSI-RS signaling, compute CSI based on the non-beamformed CSI-RS signaling, and indicate the CSI to the network node for configuring the beamformed CSI-RS signaling using the common PMI.

According to one or more embodiments of this aspect, the CSI indicates at least one of a PMI and MCS reported by the wireless device. According to one or more embodiments of this aspect, the beamformed CSI-RS signaling is communicate using a common MCS that is based on the MCS reported by the first wireless device. According to one or more embodiments of this aspect, the processing circuitry is further configured to receive a restriction configured to limit a rank that is indicatable in the CSI.

According to one or more embodiments of this aspect, the rank is limited to rank-1 PMI. According to one or more embodiments of this aspect, the processing circuitry is further configured to receive a data traffic channel that is communicated using a common CQI that is based on the indicated CQI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
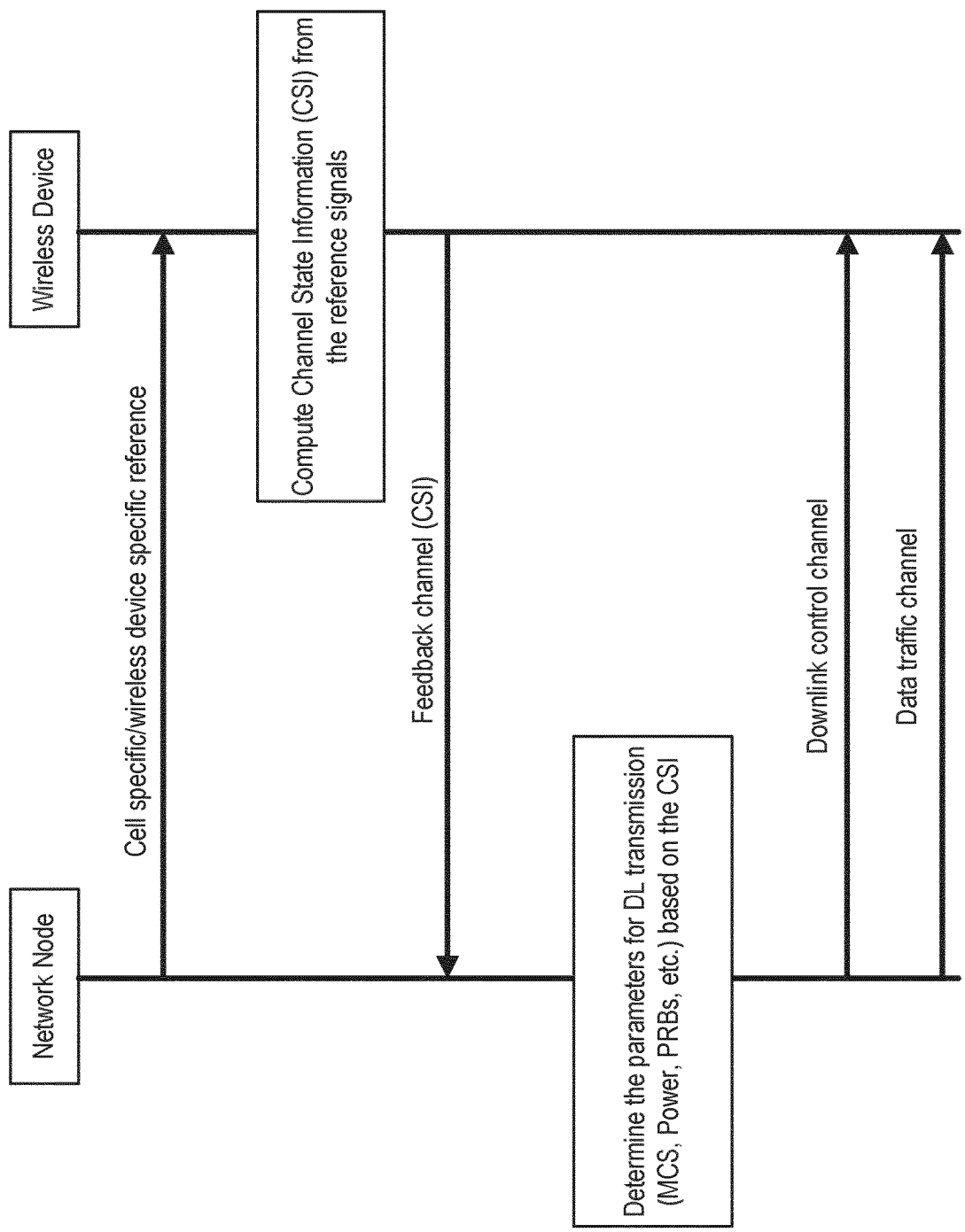
FIG. 1 is a diagram of a message sequence between a network node and a wireless device.

In NR multicast or broadcast, even though the wireless device can report its own CSI, the network node may need to schedule the same information for multicast using the same channel. Hence, the network node may have to choose the "correct" set of parameters for scheduling. For example, if each wireless device reports a different Precoder Matrix Indicator (PMI) and channel quality indicator in its respect CSI, the network node choosing the "correct" set of parameters for broadcast of the data channel for all the wireless devices becomes a challenging problem. For instance, if the network node selects parameters such that the network node transmission reaches only a few wireless devices of the various scheduled wireless devices, then HARQ retransmissions may be triggered which may reduce the spectral efficiency of NR systems as resources are consumed for the retransmissions. One approach to implement beamforming for point-to-multipoint (PTM) transmission is where a transmit antenna precoding vector is calculated given the complex channel coefficients to all the wireless devices in the PTM group, such that the received signal power over all the wireless devices is maximized.

Before describing in detail exemplary embodiments, it is noted that the embodiments reside primarily in combinations of apparatus components and processing steps related to beamforming the broadcast of a data channel to multiple wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device such as a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide beamforming the broadcast of a data channel to multiple wireless devices.

Figure 2:
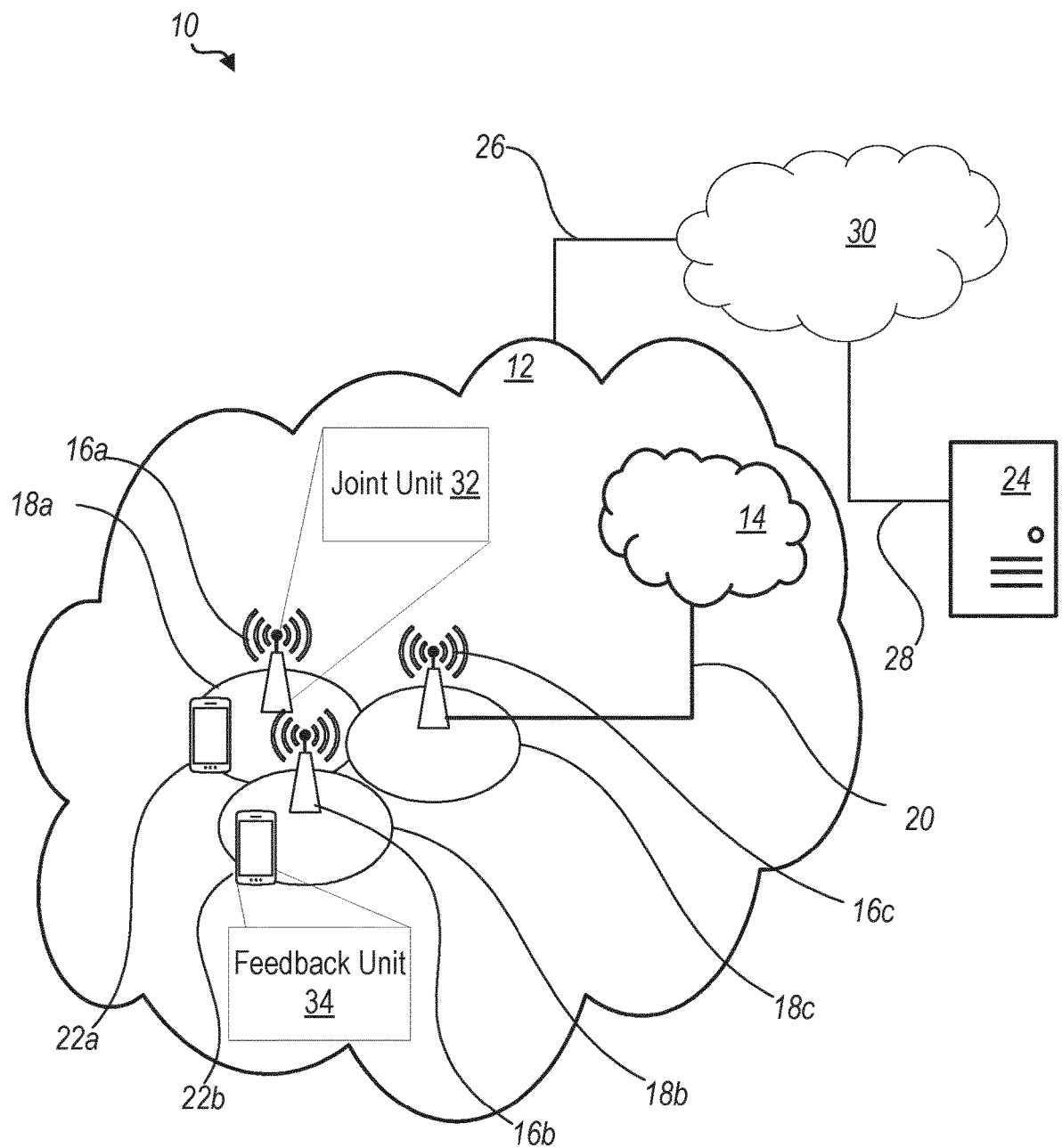
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a joint unit 32 which is configured to perform one or more network node 16 functions as described herein such as with respect to beamforming the broadcast of a data channel to multiple wireless devices 22. A wireless device 22 is configured to include a feedback unit 34 which is configured to perform one or more wireless device 22 functions as described herein such as with respect to beamforming the broadcast of a data channel to multiple wireless devices 22.

Example implementations, in accordance with an embodiment, of the wireless device 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, store, determine, forward, relay, transmit, receive, communicate, select, etc., information related to beamforming the broadcast of a data channel to multiple wireless devices 22.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include joint unit 32 configured to perform one or more network node 16 functions as described herein such as with respect to beamforming the broadcast of a data channel to multiple wireless devices 22.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a feedback unit 34 configured to perform one or more wireless device 22 functions as described herein such as with respect to beamforming the broadcast of a data channel to multiple wireless devices 22.

Figure 3:
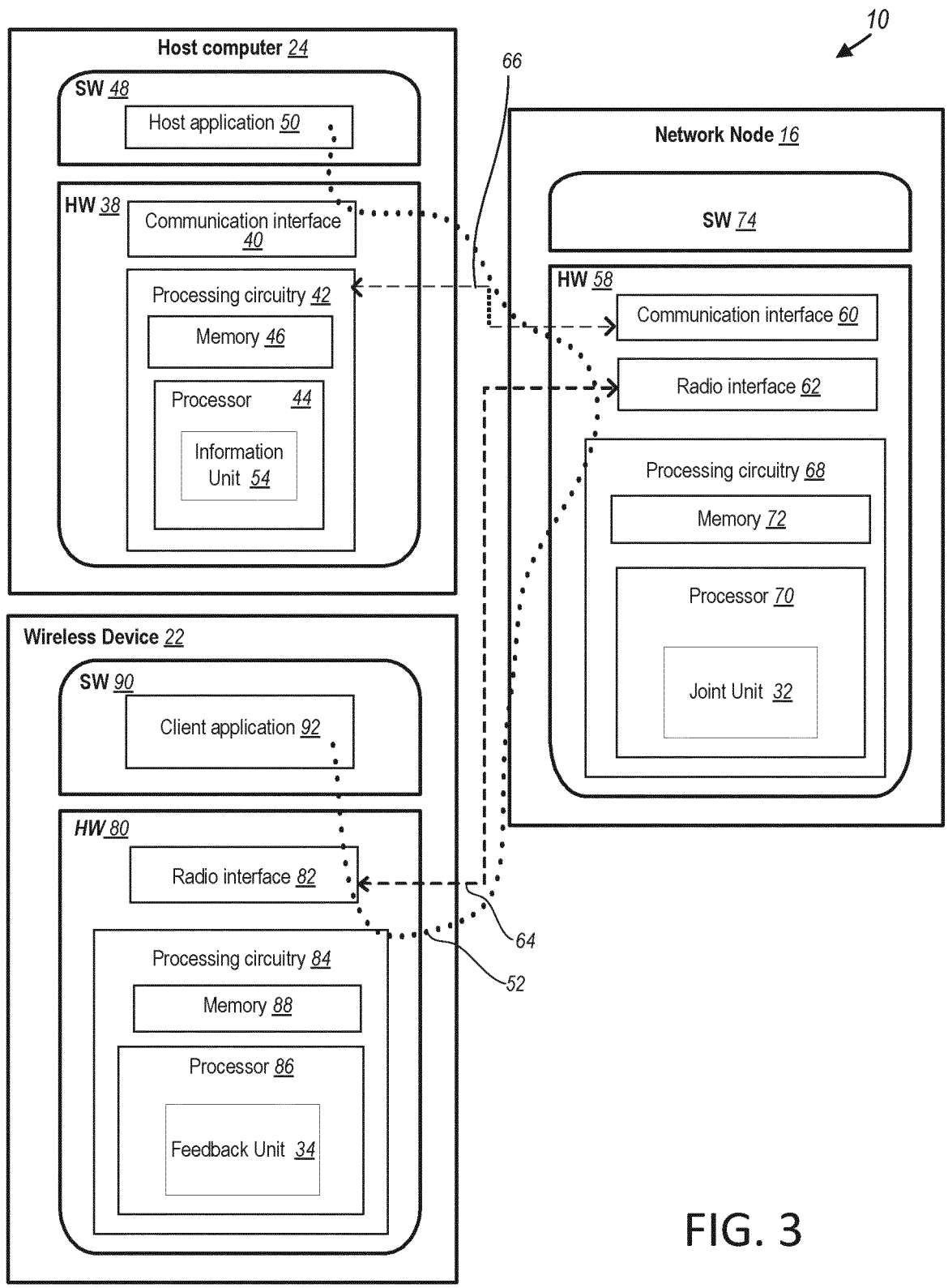
FIG. 3 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as joint unit 32, and feedback unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
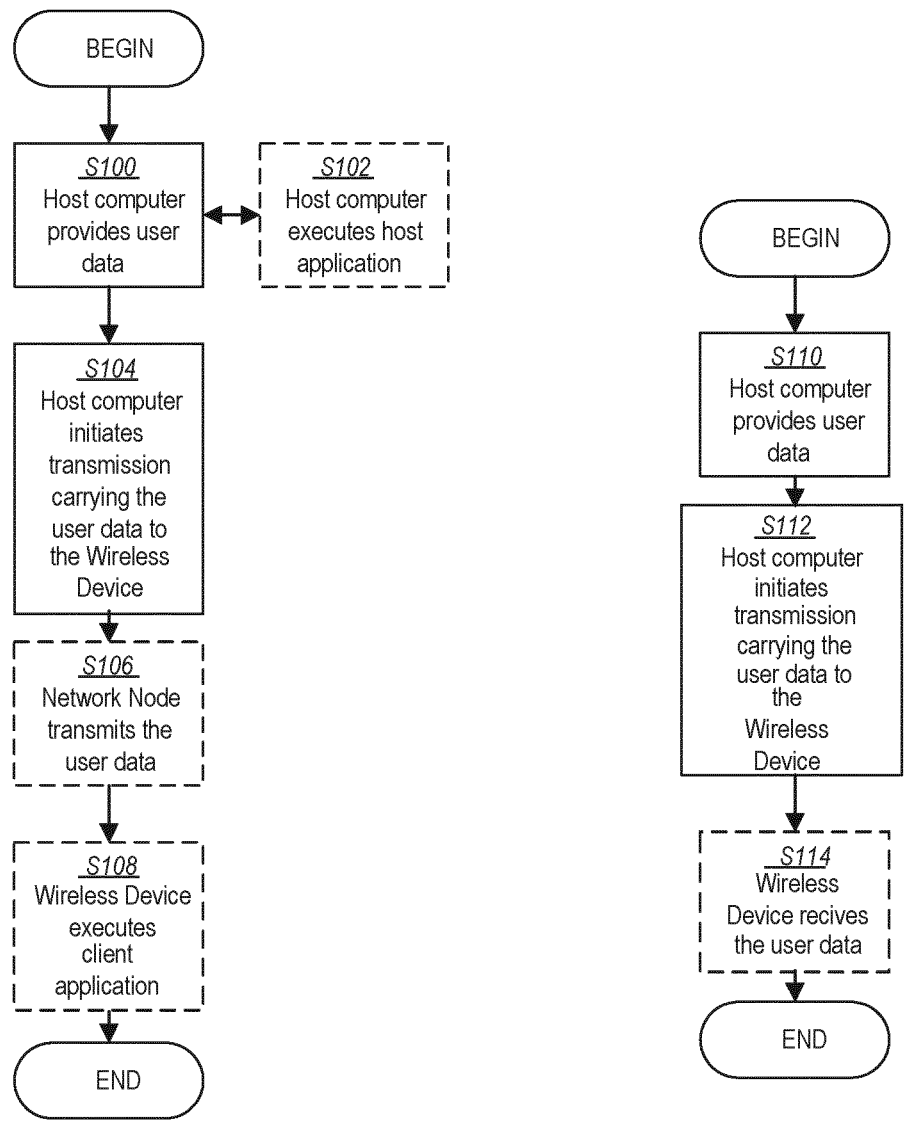
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a wireless device 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device 22 provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a wireless device 22, which may be those described with reference to FIGS. 2 and 3. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
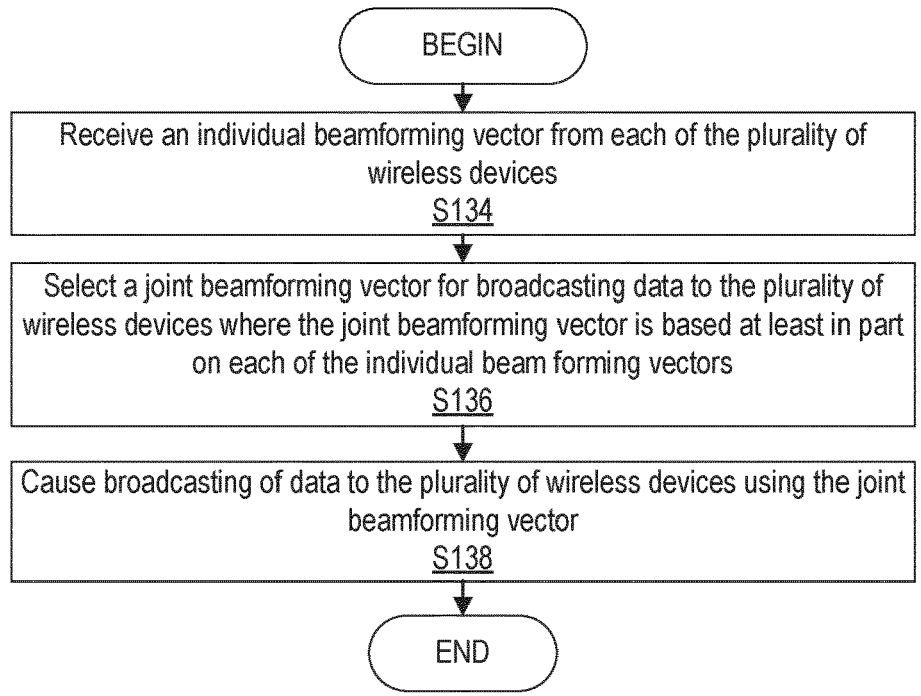
FIG. 8 is a flowchart of an exemplary process in a network node according to some embodiments of the present disclosure.

FIG. 8 is a flowchart of an exemplary process in a network node 16 according to one or more embodiments of the present disclosure. One or more Blocks and/or functions performed by network node 16 may be performed by one or more elements of network node 16 such as by joint unit 32 in processing circuitry 68, processor 70, radio interface 62, etc. In one or more embodiments, network node 16 such as via one or more of processing circuitry 68, processor 70, joint unit 32, communication interface 60 and radio interface 62 is configured to receive (Block S134) an individual beamforming vector from each of the plurality of wireless devices 22, as described herein. In one or more embodiments, network node 16 such as via one or more of processing circuitry 68, processor 70, joint unit 32, communication interface 60 and radio interface 62 is configured to select (Block S136) a joint beamforming vector for broadcasting data to the plurality of wireless devices 22 where the joint beamforming vector is based at least in part on each of the individual beam forming vectors, as described herein. In one or more embodiments, network node 16 such as via one or more of processing circuitry 68, processor 70, joint unit 32, communication interface 60 and radio interface 62 is configured to cause (Block S138) broadcast of data to the plurality of wireless devices 22 using the joint beamforming vector, as described herein.

According to one or more embodiments, the network node 16 and/or the radio interface 62 and/or the processing circuitry 68 is further configured to select at least one of a joint channel quality indicator (CQI) and joint modulation and coding scheme (MCS) for the broadcasting of the data to the plurality of wireless devices 22, as described herein. According to one or more embodiments, the network node 16 and/or the radio interface 62 and/or the processing circuitry 68 is further configured to ensure that the selected joint beamforming vector is not in a null space of any one of the individual beamforming vectors, as described herein. According to one or more embodiments, the network node 16 and/or the radio interface 62 and/or the processing circuitry 68 is further configured to restrict precoding matrices that are selectable at the plurality of wireless devices 22 to rank 1 precoding matrices, as described herein.

Figure 9:
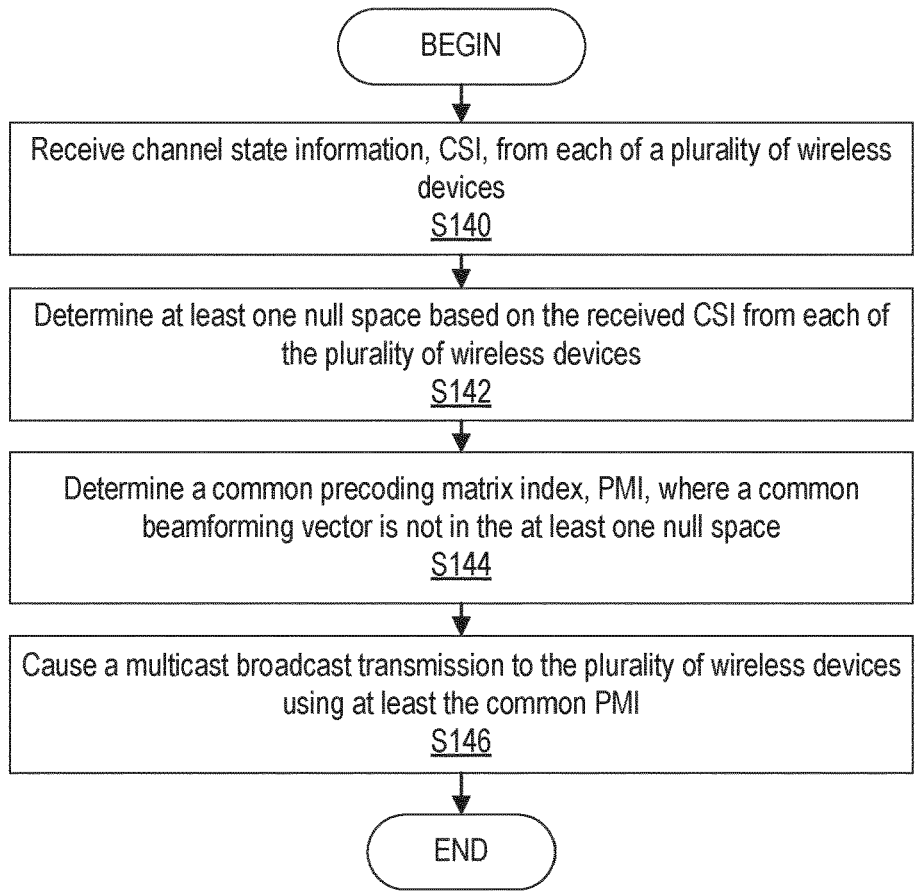
FIG. 9 is a flowchart of an exemplary process in a network node according to some embodiments of the present disclosure.

FIG. 9 is a flowchart of an exemplary process in a network node 16 according to one or more embodiments of the present disclosure. One or more Blocks and/or functions performed by network node 16 may be performed by one or more elements of network node 16 such as by joint unit 32 in processing circuitry 68, processor 70, radio interface 62, etc. In one or more embodiments, network node 16 such as via one or more of processing circuitry 68, processor 70, joint unit 32, communication interface 60 and radio interface 62 is configured to receive (Block S140) channel state information, CSI, from each of a plurality of wireless devices 22, as described herein. In one or more embodiments, network node 16 such as via one or more of processing circuitry 68, processor 70, joint unit 32, communication interface 60 and radio interface 62 is configured to determine (Block S142) at least one null space based on the received CSI from each of the plurality of wireless devices 22, as described herein. In one or more embodiments, network node 16 such as via one or more of processing circuitry 68, processor 70, joint unit 32, communication interface 60 and radio interface 62 is configured to determine (Block S144) a common precoding matrix index, PMI, where a common beamforming vector is not in the at least one null space, as described herein. In one or more embodiments, network node 16 such as via one or more of processing circuitry 68, processor 70, joint unit 32, communication interface 60 and radio interface 62 is configured to cause (Block S146) a multicast broadcast transmission to the plurality of wireless devices 22 using at least the common PMI, as described herein.

According to one or more embodiments of this aspect, the processing circuitry 68 is further configured to cause transmission of a non-beamformed CSI-reference signal, CSI-RS, signaling to the plurality of wireless devices 22 where the received CSI from each of the plurality of wireless devices 22 is based on the non-beamformed CSI-RS signaling. According to one or more embodiments of this aspect, the common PMI is determined to allow for a maximum common MCS at which each of the plurality of wireless devices 22 have a block error rate, BLER, below a target BLER. According to one or more embodiments of this aspect, the processing circuitry 68 is further configured to signal a restriction to the plurality of wireless devices 22 where the restriction is configured to limit a rank that is indicatable in the CSI reported by each of the plurality of wireless devices 22. This may be understood as a rank restriction indication. According to one or more embodiments of this aspect, the rank is limited to rank-1 PMI.

According to one or more embodiments of this aspect, the processing circuitry 68 is further configured to generate a plurality of inner products in matrix form of precoders indicated in each CSI received from the plurality of wireless devices 22 and select one of a row and column from the matrix that avoids the at least one null space where the common PMI is based on the selected one of the row and column from the matrix. According to one or more embodiments of this aspect, the processing circuitry 68 is further configured to determine a common channel quality indicator, CQI, based at least on the CSI received from each of the plurality of wireless devices 22 where the broadcast transmission to the plurality of wireless devices 22 uses at least the common CQI. According to one or more embodiments of this aspect, the CSI received from each of the plurality of wireless devices 22 includes a CQI reported by the wireless device 22 where the common CQI corresponds to a CQI having a minimum index of CQIs reported by the plurality of wireless devices 22.

According to one or more embodiments of this aspect, the processing circuitry 68 is further configured to map the common CQI to an MCS by accounting for resource availability where the MCS corresponds to a common MCS, the broadcast transmission to the plurality of wireless devices 22 using at least the common MCS. According to one or more embodiments of this aspect, the processing circuitry 68 is further configured to cause transmission of beamformed CSI-RS signaling to the plurality of wireless devices 22 where the beamformed CSI-RS signaling is based on the common PMI. The processing circuitry 68 is further configured to receive additional CSI from each of the plurality of wireless devices 22 based on the beamformed CSI-RS signaling where the determining of the common CQI is further based at least on the additional CSI and where the broadcast transmission to the plurality of wireless devices 22 uses the common CQI. According to one or more embodiments of this aspect, the processing circuitry 68 is further configured to determine a common modulation and coding scheme, MCS, based at least on the CSI from each of the plurality of wireless devices 22 where the broadcast transmission to the plurality of wireless devices 22 uses at least the common MCS.

According to one or more embodiments of this aspect, the determining of the common MCS based at least on the CSI from each of the plurality of wireless devices 22 includes aggregating CQIs in the CSIs from the plurality of wireless devices 22 and mapping the aggregated CQI to an MCS that corresponds to the common MCS. According to one or more embodiments of this aspect, the determining of the common MCS based at least on the CSI from each of the plurality of wireless devices 22 includes mapping CQIs in the CSIs from the plurality of wireless devices 22 to a plurality of MCSs, and aggregating the plurality of MCSs to an MCS that corresponds to the common MCS. According to one or more embodiments of this aspect, the processing circuitry 68 is further configured to generate a plurality of inner products in matrix form of precoders indicated in each CSI received from each of the plurality of wireless devices 22, determine more than one row from the matrix corresponds to the inner product is greater than 0; and use a scaling factor to estimate a resulting received signal power at each of the plurality of wireless devices 22. The common PMI is based on the estimate of the resulting received signal power at each of the plurality of wireless devices 22.

According to one or more embodiments of this aspect, the scaling factor is an approximate representation of a path gain between the network node and the wireless device 22. According to one or more embodiments of this aspect, the CSI received from each of the plurality of wireless devices 22 includes a CQI reported by the respective wireless device 22. The processing circuitry 68 further configured to map the common CQI to a MCS, map each reported CQI to a MCS and select a common MCS based at least one the mapping of the common CQI and each reported CQI.

Figure 10:
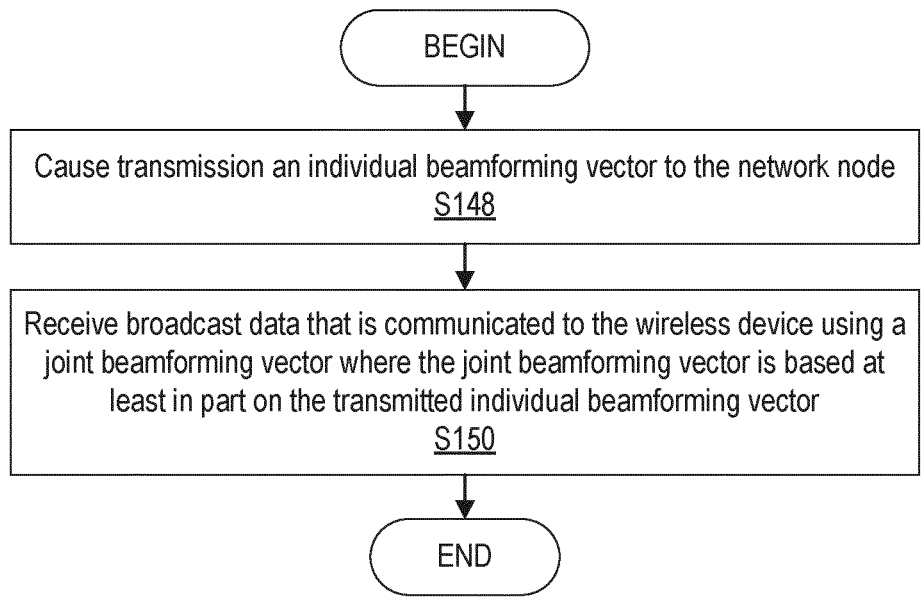
FIG. 10 is a flowchart of an exemplary process in a wireless device according to some embodiments of the present disclosure.

FIG. 10 is a flowchart of an exemplary process in a wireless device 22 according to one or more embodiments of the present disclosure. One or more Blocks and/or functions performed by wireless device 22 may be performed by one or more elements of wireless device 22 such as by feedback unit 34 in processing circuitry 84, processor 86, radio interface 82, etc. In one or more embodiments, wireless device 22 such as via one or more of processing circuitry 84, processor 86, feedback unit 34 and radio interface 82 is configured to cause transmission (Block S148) of an individual beamforming vector to the network node 16, as described herein. In one or more embodiments, wireless device such as via one or more of processing circuitry 84, processor 86, feedback unit 34 and radio interface 82 is configured to receive (Block S150) broadcast data that is communicated to the wireless device 22 using a joint beamforming vector where the joint beamforming vector is based at least in part on the transmitted individual beamforming vector, as described herein.

According to one or more embodiments, the broadcast data is communicated using a joint channel quality indicator (CQI) and joint modulation and coding scheme (MCS). According to one or more embodiments, the joint beamforming vector is not in a null space of the transmitted individual beamforming vector. According to one or more embodiments, the wireless device 22 and/or the radio interface 82 and/or the processing circuitry 84 is configured to receive an indication of a restriction that restricts selectable precoding matrices to rank 1 precoding matrices, and select a precoding matrix of rank 1 where the transmitted individual beamforming vector is based at least in part on the selected precoding matrix of rank 1.

Figure 11:
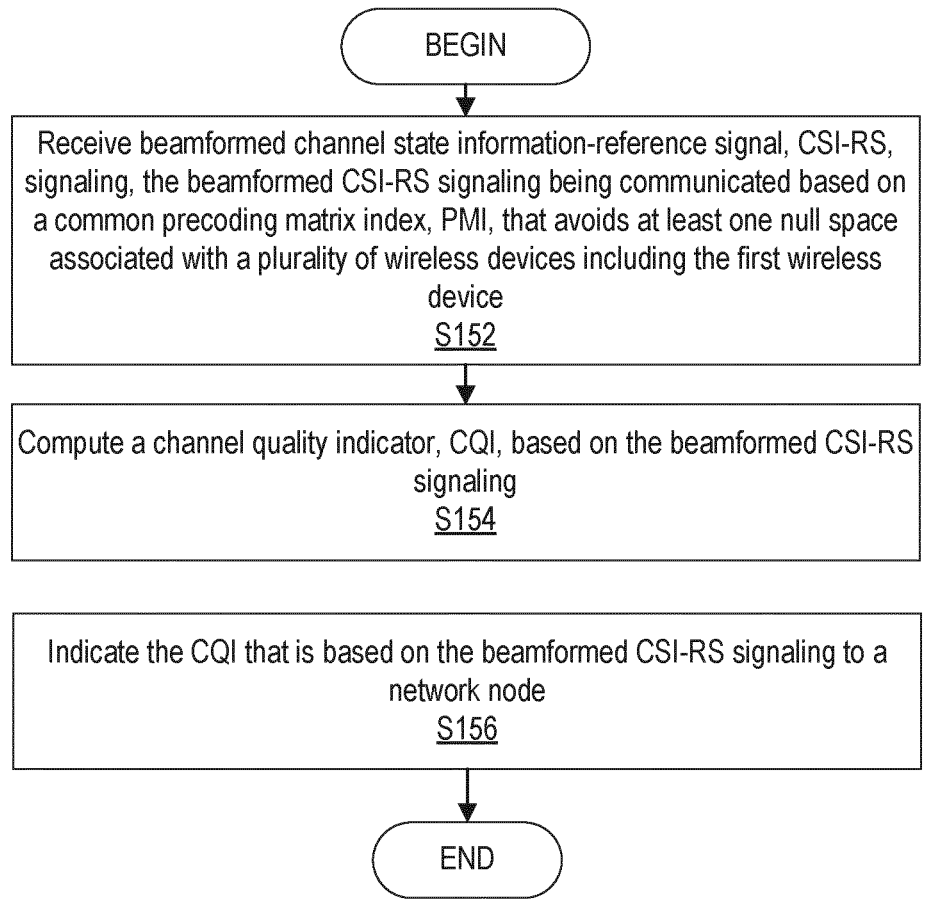
FIG. 11 is a flowchart of an exemplary process in a wireless device according to some embodiments of the present disclosure.

FIG. 11 is a flowchart of an exemplary process in a wireless device 22 according to one or more embodiments of the present disclosure. One or more Blocks and/or functions performed by wireless device 22 may be performed by one or more elements of wireless device 22 such as by feedback unit 34 in processing circuitry 84, processor 86, radio interface 82, etc. In one or more embodiments, wireless device such as via one or more of processing circuitry 84, processor 86, feedback unit 34 and radio interface 82 is configured to receive (Block S152) beamformed channel state information-reference signal, CSI-RS, signaling where the beamformed CSI-RS signaling is communicated based on a common precoding matrix index, PMI, that avoids at least one null space associated with a plurality of wireless devices 22 including the first wireless device 22, as described herein.

In one or more embodiments, wireless device such as via one or more of processing circuitry 84, processor 86, feedback unit 34 and radio interface 82 is configured to compute (Block S154) a channel quality indicator, CQI, based on the beamformed CSI-RS signaling, as described herein. In one or more embodiments, wireless device such as via one or more of processing circuitry 84, processor 86, feedback unit 34 and radio interface 82 is configured to indicate (Block S156) indicate the CQI that is based on the beamformed CSI-RS signaling to a network node 16, as described herein.

According to one or more embodiments of this aspect, the processing circuitry 84 is further configured to receive signaling to report CSI without PMI, in other words to send only CQI as part of the CSI report, the computed CQI being performed based on the signaling. According to one or more embodiments of this aspect, the processing circuitry 84 is further configured to receive a broadcast transmission that uses the common PMI. According to one or more embodiments of this aspect, the processing circuitry 84 is further configured to receive non-beamformed CSI-RS signaling, compute CSI based on the non-beamformed CSI-RS signaling, and indicate the CSI to the network node 16 for configuring the beamformed CSI-RS signaling using the common PMI.

According to one or more embodiments of this aspect, the CSI indicates at least one of a PMI and MCS reported by the wireless device 22. According to one or more embodiments of this aspect, the beamformed CSI-RS signaling is communicate using a common MCS that is based on the MCS reported by the first wireless device 22. According to one or more embodiments of this aspect, the processing circuitry 84 is further configured to receive a restriction configured to limit a rank that is indicatable in the CSI. According to one or more embodiments of this aspect, the rank is limited to rank-1 PMI. Rank 1 PMI is a PMI corresponding to rank 1. According to one or more embodiments of this aspect, the processing circuitry 84 is further configured to receive a data traffic channel that is communicated using a common CQI that is based on the indicated CQI.

Having described the general process flow of arrangements of the disclosure and having provided examples of hardware and software arrangements for implementing the processes and functions of the disclosure, the sections below provide details and examples of arrangements for beamforming the broadcast of a data channel to multiple wireless devices 22.

Figure 12:
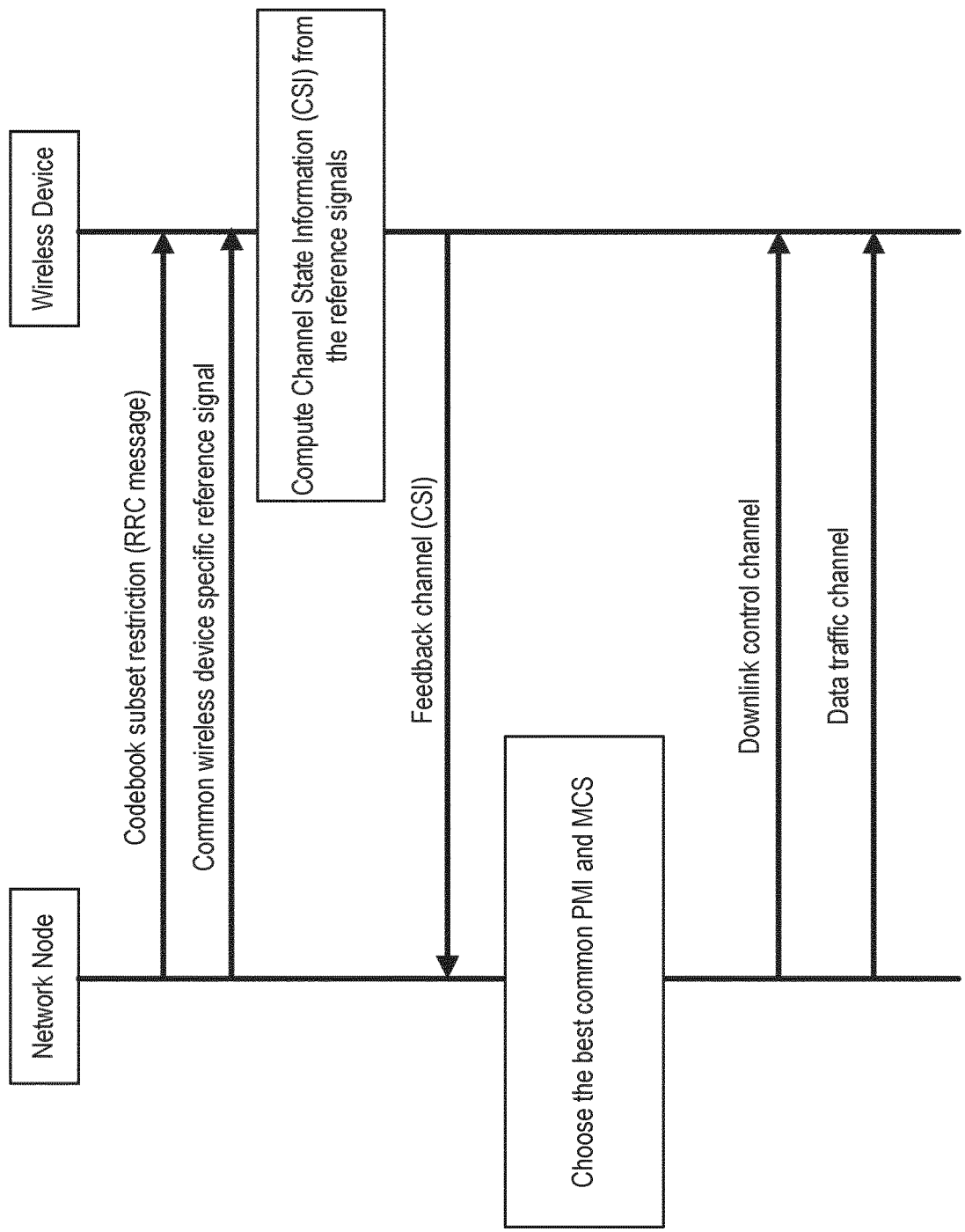
FIG. 12 is a signaling diagram of signaling between the network node and wireless device according to some embodiments of the present disclosure.

In one or more embodiments described herein, network node 16 choses and/or selects and/or determines the "correct" beamforming vector (i.e., joint beamforming vector) from a set of wireless device preferred beamforming vectors (i.e., individual beamforming vectors) such that network node 16 transmission using the common beamforming matrix provides the best spectral efficiency while at the same time helping reduce the number of retransmissions. FIG. 12 is a signaling diagram of communications between network node 16 and wireless device 22 according to one or more embodiments of the disclosure.

As illustrated in FIG. 12, the network node such as via one or more of processing circuitry 68, processor 70, radio interface 62, joint unit 32, etc., may optionally send a restriction message using radio resource control (RRC) signaling to inform the wireless device 22 to choose and/or select only rank-1 precoding matrices such as for CSI. Rank 1 precoding may be used for broadcast purposes. Based on the channel state information reference signal (CSI-RS) signaling, the wireless device 22 such as via one or more of processing circuitry 84, processor 86, radio interface 82, feedback unit 34, etc., can estimate the behavior of the communications channel, i.e., can perform one or more measurements and/or make one or more channel characteristic based determinations. According to this estimation, the wireless device 22 such as via one or more of processing circuitry 84, processor 86, radio interface 82, feedback unit 34, etc., generates a CSI report and transmits the CSI report to the network node 16, i.e., feeds back the CSI report via a feedback channel.

The report (also referred to as the CSI report) includes a suggestion from the wireless device 22 as to how the network node 16 may spatially precode the data streams to mitigate the channel effects. This "suggestion" may be specific to the wireless device 22 such as based on determinations and/or selections and/or process performed by the wireless device 22 such as via one or more of processing circuitry 84, processor 86, radio interface 82, feedback unit 34, etc. Further, since in one or more embodiments the network node 16 may optionally restrict the wireless device 22 to reporting only rank-1 precoding (i.e., precoding corresponding to rank-1), the wireless device 22 may send only PMI, CQI information. In one or more embodiments, the PMI indicates a column (or row) of the precoder matrix where the wireless device 22 may report a certain number of PMIs such as, for example, at most a number equal to a signaled rank limitation. Once the network node 16 such as via one or more of processing circuitry 68, processor 70, radio interface 62, joint unit 32, etc., receives the CSI from each wireless device, the network node 16 such as via one or more of processing circuitry 68, processor 70, radio interface 62, joint unit 32, etc., chooses the common PMI (PMIg) and common CQI (CQIg) or MCS (MCSg) for scheduling all the wireless devices for NR PDSCH (broadcast). An example method to compute the common PMI, common CQI and common MCS is described below. As used herein, common PMI, common CQI and common MCS may be referred to as joint PMI, joint CQI and joint MCS.

Let $CQI_1, CQI_2, \ldots, CQI_N$ be the reported CQI by the N wireless devices 22 in the cell and $PMI_1, PMI_2, \ldots, PMI_N$ be the reported PMI. Then the common CQI ($CQI_g$) is computed as $$CQI_g = \min(CQI_1, CQI_2, \ldots CQI_N)$$

Similarly, common MCS ($MCS_g$) is computed as $$MCS_g = \min(MCS_1, MCS_2, \ldots MCS_N)$$

That is, the network node 16 such as via one or more of processing circuitry 68, processor 70, radio interface 62, joint unit 32, etc., may at least help ensure that the broadcast data will be received by the worst SINR wireless device 22 such as cell edge wireless device 22, i.e., a wireless device 22 at the cell edge that may receive worst SINR than wireless devices 22 closer to the network node 16 or toward the center of the cell.

In one or more embodiments, it may be assumed that the precoder is reported by the wireless device 22.

The common PMI ($PMI_g$) is computed as described below.

Denote by $P_i$ the beamforming vector corresponding the $PMI_i$ reported by UEi (i.e., wireless device 22i) and $P_j$ is the precoding vector corresponding to $PMI_j$ reported by UE j (i.e., wireless device 22j). In a further solution, it may be assumed that the precoding vector $P_i$ is up to a scaling factor ai that is a sufficient close representation of the conjugate of the channel vector estimated by UE i, so that if the network node 16 such as via one or more of processing circuitry 68, processor 70, radio interface 62, joint unit 32, etc., applies the $P_i$ then the signal energy received by UE i is close to the maximum achievable by any other precoding vector. In other words the scaling factor associated with the wireless device is an approximate representation of a path gain between the network node and the wireless device. The scaling factors αj can be estimated from the RSRP value reported by the UE j. One embodiment is to equate the αj with the RSRP (in linear domain, not dB) reported by the UE j. In another embodiment, the scaling factors can be estimated from the reported CQI values. In another embodiment the scaling factor values can be obtained from uplink measurements such as path gain in the uplink PMI projection is defined as $$v_{ij} = |P_i^H P_j|$$

where $v_{ij}$ is a scalar and |.| denotes absolute value.

The common matrix V is defined as $$V = \begin{pmatrix} v_{11} & \cdots & v_{1N} \\ \vdots & \ddots & \vdots \\ v_{N1} & \cdots & v_{NN} \end{pmatrix}$$

That is, the inner product of each individual PMIs is formulated in the matrix form. The diagonal elements of the matrix V may be equal to one and V is Hermitian. Each row and each column of V correspond to the PMI of one wireless device 22. Then, in one or more embodiments, the common PMI is selected and/or chosen and/or determined such that the common beamforming vector is not in the null space of any other PMI's chosen by the individual wireless devices 22, i.e., a row (or column) is selected such as by network node 16 via one or more of processing circuitry 68, processor 70, radio interface 62, joint unit 32, etc., where the all $v_{i,j} > 0$ so that all wireless devices 22 (i.e., plurality of wireless device 22) will receive signal power above zero.

In a further solution, in one or more embodiments, there are multiple such rows where $v_{i,j} > 0$. In order for the network node 16 such as via one or more of processing circuitry 68, processor 70, radio interface 62, joint unit 32, etc., to select one of them, the network node 16 may estimate the resulting received signal power $R_{i,j}$ at each wireless device 22 by multiplying the scaling factor $\alpha_j$ with the PMI projections:

$$R = \begin{pmatrix} v_{11}\alpha_1 & \cdots & v_{1N}\alpha_N \\ \vdots & \ddots & \vdots \\ v_{N1}\alpha_1 & \cdots & v_{NN}\alpha_N \end{pmatrix}$$

The scaling factors $\alpha_j$ can be estimated from the RSRP value reported by the UE j. One embodiment is to equate the $a\alpha_j$ with the RSRP (in linear domain, not dB) reported by the UE j.

In one or more embodiments, the network node 16 the network node 16 such as via one or more of processing circuitry 68, processor 70, radio interface 62, joint unit 32, etc., discards CQIs reported by the wireless devices 22 and instead uses $R_{i,j}$ as the input for the appropriate selection of $MCS_{i,j} = \text{function}(R_{i,j})$ that fullfills the desired block error rate BLER for UE j when selecting the PMI i. Applying, by network node 16, this function to all elements of matrix R yields matrix M.

In one or more embodiments, the minimum MCS that is required to provide the service bitrate is given as $MCS_{th}$.

In one or more embodiments, for the rows of V that have all elements above zero, the network node 16 such as via one or more of processing circuitry 68, processor 70, radio interface 62, joint unit 32, etc., selects the one with the largest number of elements of $MCS_{i,j} > MCS_{th}$, i.e., where the largest number or wireless devices 22 can receive the service with the target BLER when the minimum MCS is chosen that is sufficient for the service.

In one or more embodiments, if the cardinality is low, then the wireless devices 22 formed as a broadcast group can be modified, for e.g., the one or more wireless devices 22 not receiving the desirable transmission energy to meet one or more performance requirements (i.e., the lower value in the entries of matrix V) can be made part of a separate broadcast group.

In a further solution, in one or more embodiments, if in some rows all $MCS_{i,j} > MCS_{th}$, the network node 16 such as via one or more of processing circuitry 68, processor 70, radio interface 62, joint unit 32, etc., selects the row i for which $$MCS_i = \min_j(MCS_{i,j})$$

is maximized.

Therefore, in one or more embodiments, the PMI is selected that supports the maximum MCS at which all wireless devices 22 (i.e., the plurality of wireless devices 22) have BLER below the target BLER.

In a further solution, in one or more embodiments, the network node 16 is not bound to select from the PMIs provided by the wireless devices 22 such that the network node 16 such as via one or more of processing circuitry 68, processor 70, radio interface 62, joint unit 32, etc., may use any precoder $P_k$. For each candidate $P_k$, the network node 16 such as via one or more of processing circuitry 68, processor 70, radio interface 62, joint unit 32, etc., can perform the calculations described above such as adding a row to the matrices for each candidate. The network node 16 such as via one or more of processing circuitry 68, processor 70, radio interface 62, joint unit 32, etc., then applies one of the described embodiments, described herein, to select a PMI from the enlarged set of candidates.

In one or more embodiments, the network node 16 such as via one or more of processing circuitry 68, processor 70, radio interface 62, joint unit 32, etc., takes as candidates $P_k$ all precoders in the precoder book configured for the wireless device 22. In one or more embodiments, even if the union of PMIs reported by all wireless devices 22 in the group represents only a subset of the PMIs of the precoder book, the network node 16 may evaluate all PMIs of the precoder book.

In one or more embodiments, the network node 16 such as via one or more of processing circuitry 68, processor 70, radio interface 62, joint unit 32, etc., evaluates all candidates from a precoder book that contains a larger number of PMIs than those configured for the wireless devices 22 to report. The precoder book used by the network node 16 may preferably contain a smaller quantization of the phases and powers of the elements in the precoder than is used in the precoder book that is configured for the wireless device 22, which may be kept small in order to limit or keep small the amount of signaling information bit that the wireless device 22 may need to use for the PMI reporting.

Figure 13:
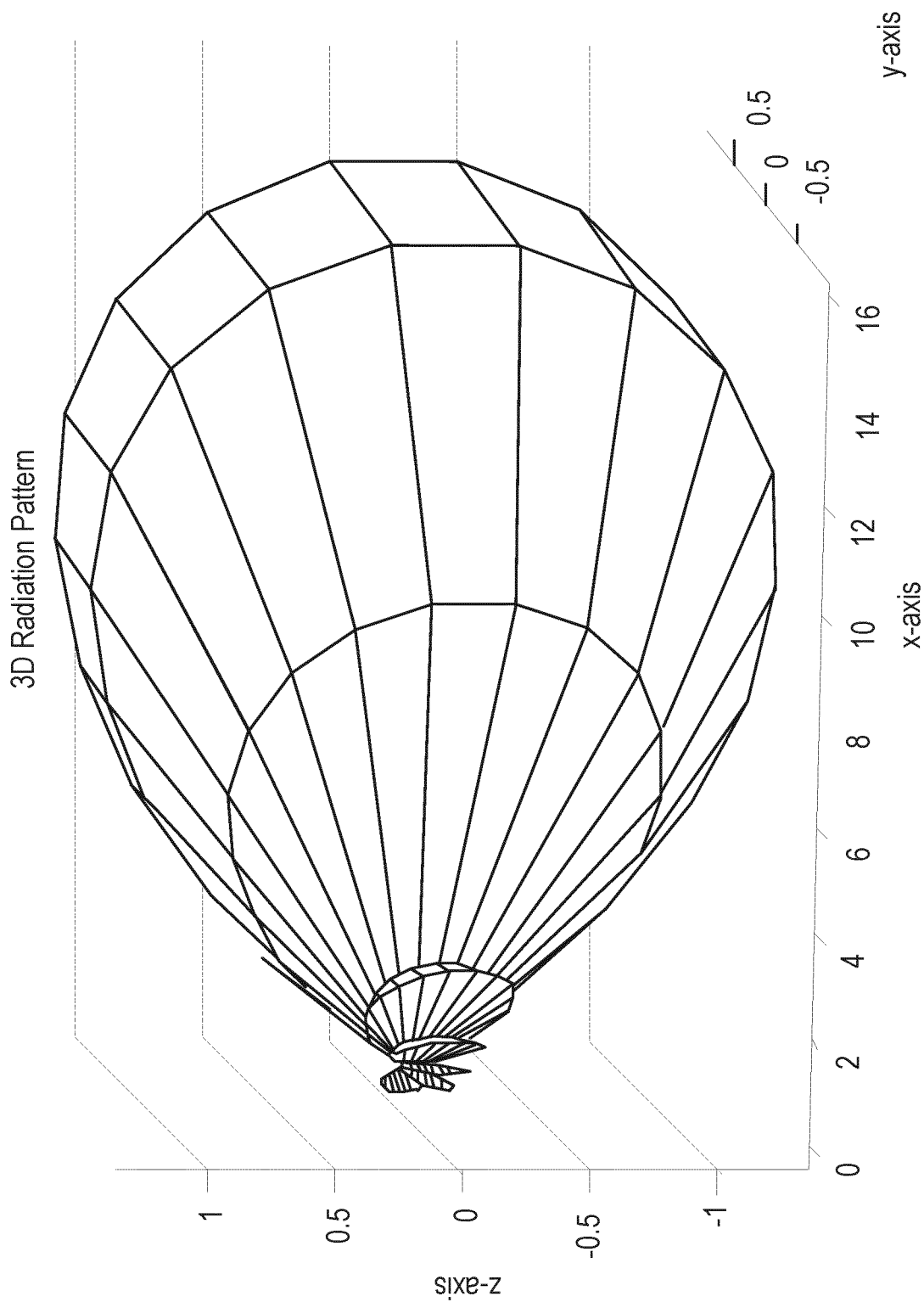
FIG. 13 is a diagram of a 3D radiation pattern of a signal according to some embodiments of the present disclosure.

As an example, FIG. 13 is a diagram of an example radio pattern of a desired signal where the radiation diagram of wireless device 22a's preferred PMI (e.g., $PMI_1$) is illustrated.

Figure 14:
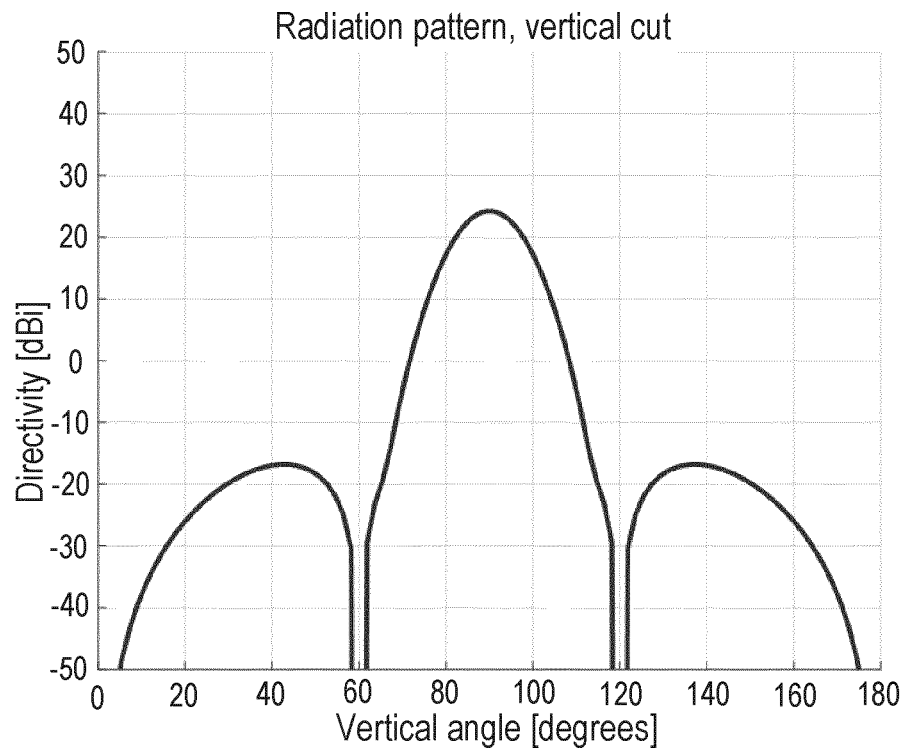
FIG. 14 is a diagram of a 2D radiation pattern of a signal in the Azimuth direction according to some embodiments of the present disclosure.
Figure 15:
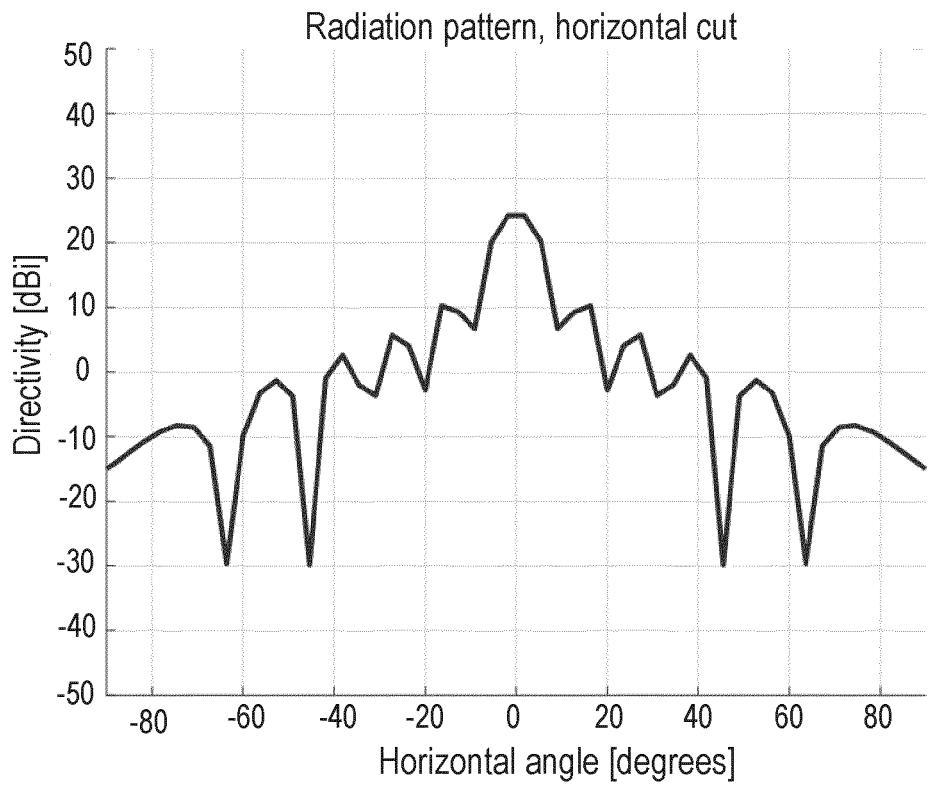
FIG. 15 is a diagram of a 2D radiation pattern of a signal in the elevation domain according to some embodiments of the present disclosure.

FIGS. 14 and 15 are graphs illustrating an example 2D radiation pattern of the desired signal for the azimuth and elevation domains.

Figure 16:
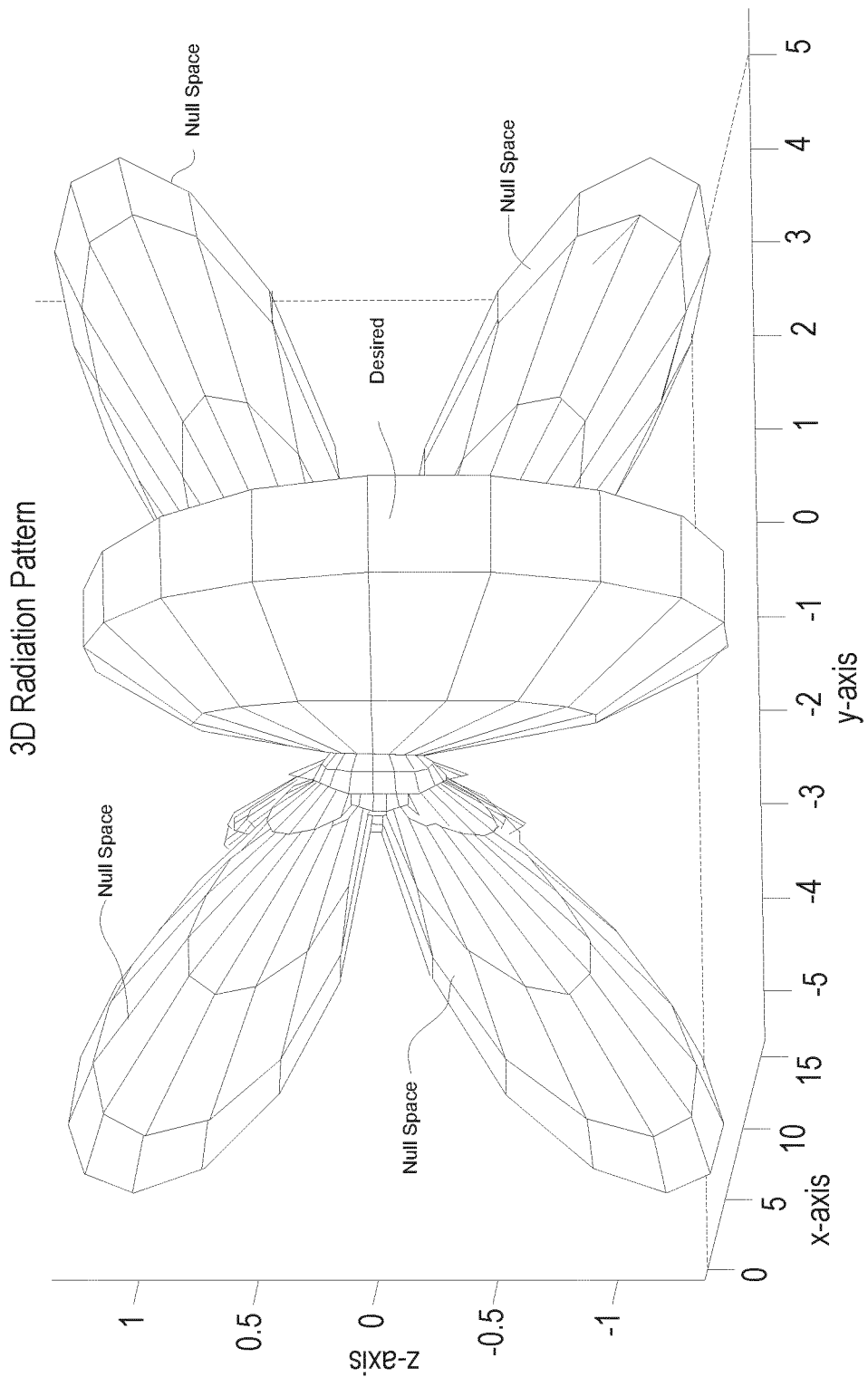
FIG. 16 is a diagram of a 3D radiation pattern of the Null space and a desired signal according to some embodiments of the present disclosure.

FIG. 16 is a graph illustrating an example 3D radiation pattern of the wireless device 22a's null space and the desired signal. As illustrated in FIG. 16, if the network node 16 such as via one or more of processing circuitry 68, processor 70, radio interface 62, joint unit 32, etc., chooses the null space of the wireless device 22a, then wireless device 22a may not get the broadcast data for the network node 16 while other wireless devices 22 may receive the broadcast data.

Figure 17:
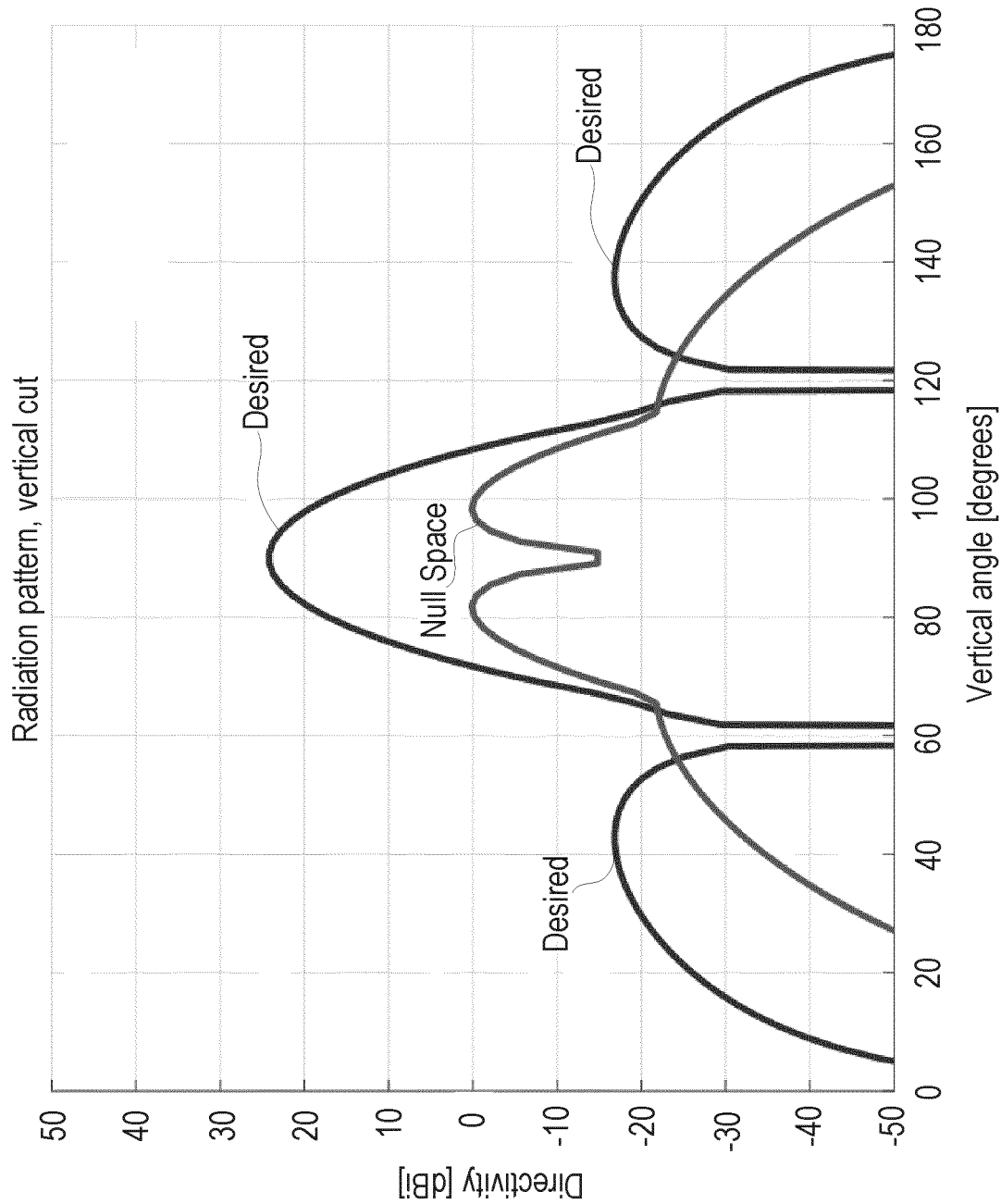
FIG. 17 is a 2D radiation pattern of the signal and null space in Azimuth domain according to some embodiments of the present disclosure.
Figure 18:
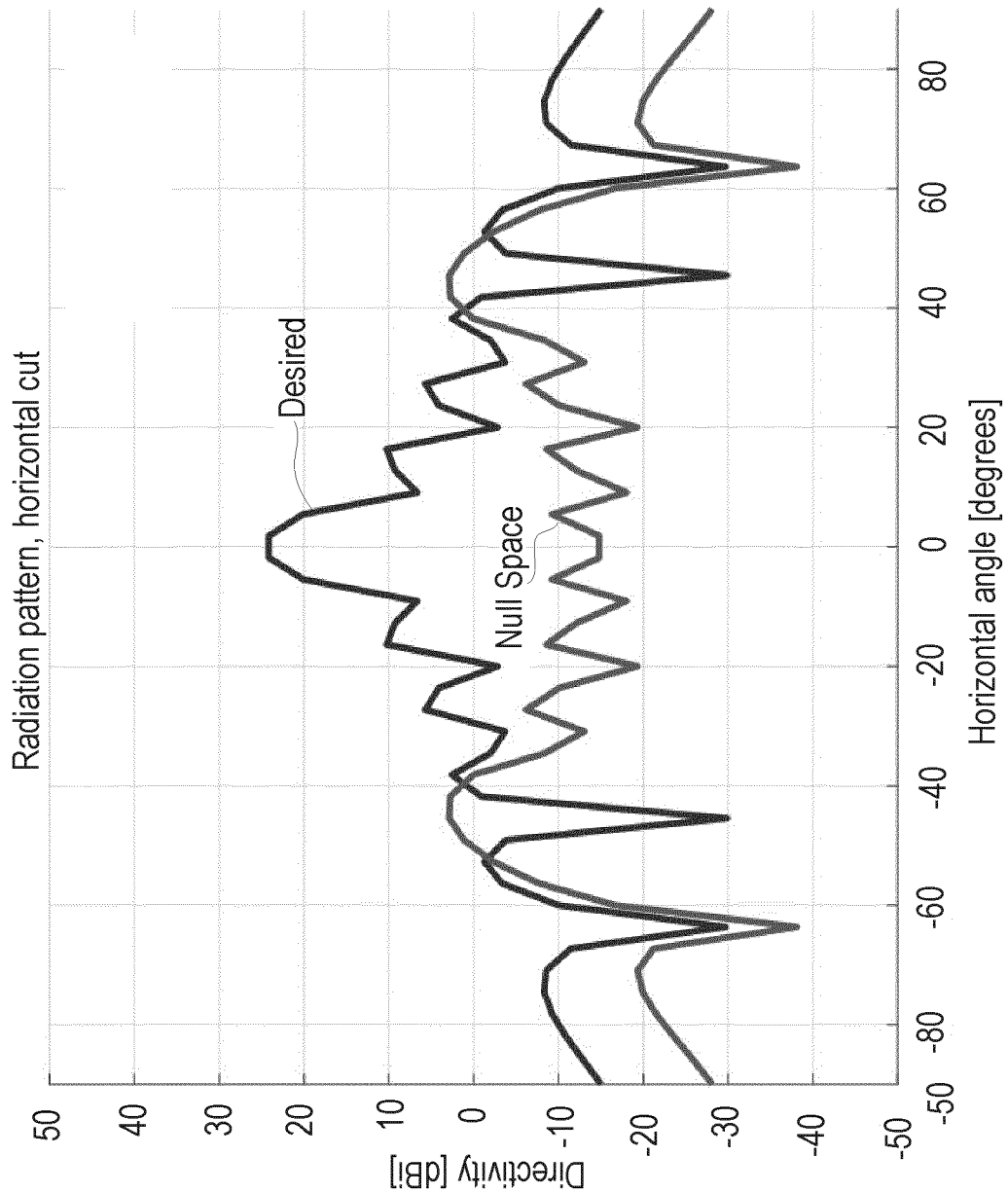
FIG. 18 is a 2D radiation pattern of a signal and the null space in elevation domain according to some embodiments of the present disclosure.

FIGS. 17 and 18 are graphs illustrating an example 2D radiation pattern of the desired signal and the null space in the azimuth and the elevation domains.

Figure 19:
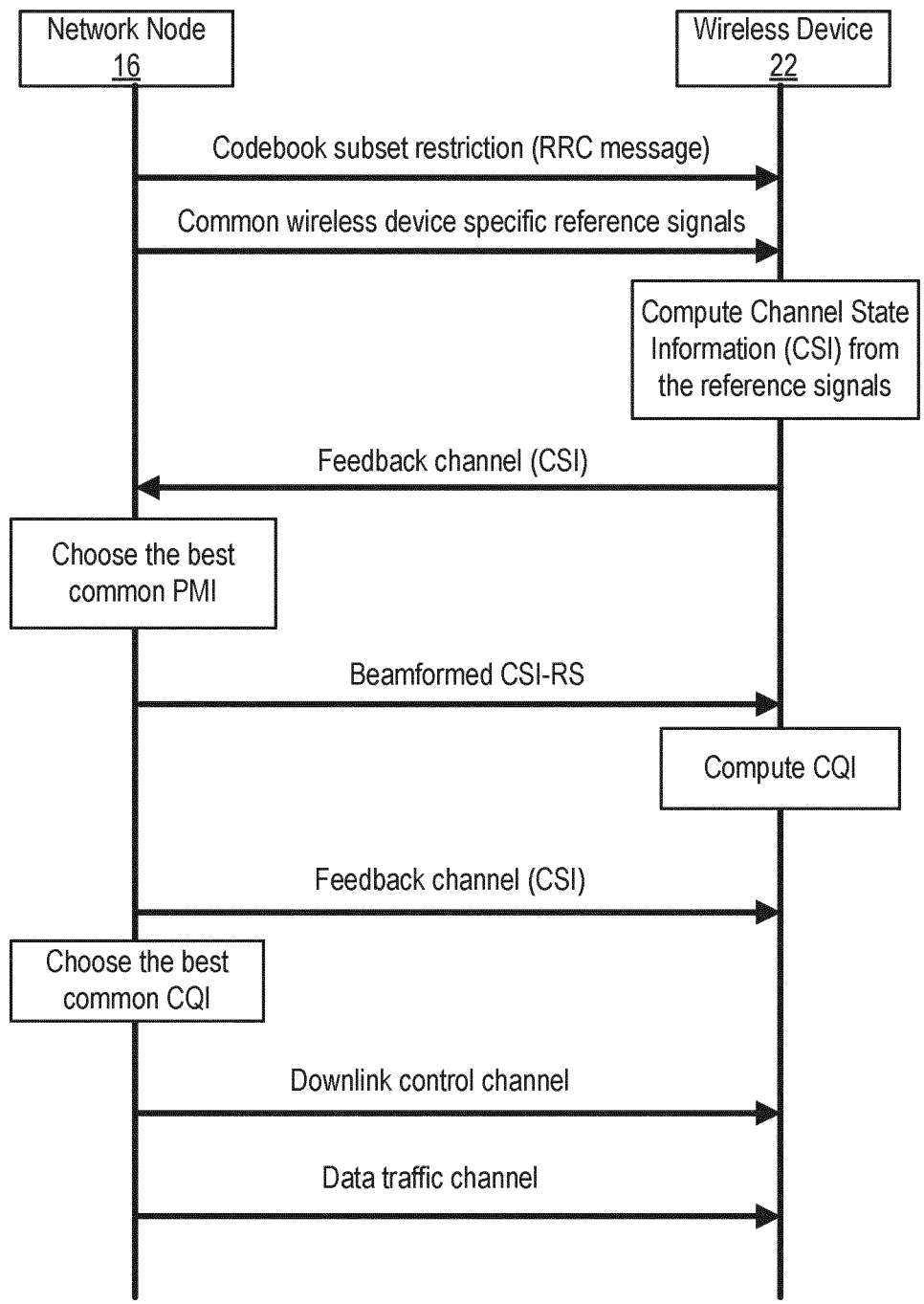
FIG. 19 is a signaling diagram of signaling between a network node and wireless device after identification of the common PMI according to some embodiments of the present disclosure.

In one or more embodiments, once the network node 16 such as via one or more of processing circuitry 68, processor 70, radio interface 62, joint unit 32, etc., identifies the common $P_g$ (corresponding to $PMI_g$), the network node 16 can beamform the CSI-RS and request for only CQI as part of CSI. In such as case, the network node 16 such as via one or more of processing circuitry 68, processor 70, radio interface 62, joint unit 32, etc., may need to send a signal indicating that it does not require PMI, but only requires CQI. An example message sequence chart between the network node 16 and wireless device 22 for this scenario is illustrated in FIG. 19. In one or more embodiments, the method of FIG. 19 may occur after the identification of the common PMI.

Note that, in one or more embodiments, the indication to the wireless device 22 to send only CQI as part of CSI report can be communicated using RRC signaling or dynamically by using the downlink control channel (which may require support and/or modification to NR specification and/or 3GPP standards) or by using a medium access control (MAC)-control element.

Therefore, in one or more embodiments, a method to enable beamforming for the broadcast and/or multicast transmission of data is provided where the beamforming may be based at least in part on, for example, feedback information provided by a plurality of wireless devices 22. In one or more embodiments, the network node 16 such as via one or more of processing circuitry 68, processor 70, radio interface 62, joint unit 32, etc., chooses a common RNTI and common cell ID for the transmission of reference signals such as DMRS and CSI-RS, and control/data channels such as PDCCH/PDSCH. In one or more embodiments, in order to help make selection and/or identification of the parameters to be used for broadcast and/or multicast as described herein, the network node 16 may send and/or transmit a restriction bit map (corresponding to rank-1) to each wireless device 22 scheduled in the broadcast/multicast transmission.

In a further or alternative approach, the network node may determine a common beamforming vector that is not in the at least one null space where the beamforming vector corresponds to at least one of the PMIs reported in the CSIs from the plurality of wireless devices.

In one or more embodiments, after the acquisition of the CSI from the wireless devices 22, the network node 16 such as via one or more of processing circuitry 68, processor 70, radio interface 62, joint unit 32, etc., chooses the appropriate MCS and beamforming vector such that the broadcasted/multicasted data is received by all the wireless devices 22. Specifically, the network node 16 helps ensure that the selected beamforming vector for data transmission is not in the null space of the PMI indicated by the wireless devices 22 as part of the CSI report, thereby helping, for example, reduce the probability of HARQ based retransmission.

Non-Limiting Examples

Example 1: A method in the network node 16 to choose the beamforming vector for broadcasting of data based on the joint optimization of the individual beamforming vectors received from the wireless devices 22.

Example 2: A method in the network node 16 according to Example 1 is based on choosing the joint beamforming vector based on the cardinality of the set of vectors where the vectors are computed based on the projecting each beamforming vector on the other wireless device 22 preferred beamforming vector.

Example 3: A method in the network node 16 according to Example 1 where the network node 16 sends a precoding bit map to such that the wireless device 22 indicates beamforming vectors corresponding to rank 1 transmission.

Example 4: A method in the network node 16 for choosing the modulation and coding scheme for broadcasting of data based on the minimum of the channel quality value received from the wireless devices 22.

Other Non-Limiting Examples

Example A1. A network node 16 configured to communicate with a plurality of wireless devices 22, the network node 16 configured to, and/or comprising a radio interface 62 and/or comprising processing circuitry 68 configured to receive an individual beamforming vector from each of the plurality of wireless devices 22; select a joint beamforming vector for broadcasting data to the plurality of wireless devices 22, the joint beamforming vector being based at least in part on each of the individual beamforming vectors; and cause broadcasting of data to the plurality of wireless devices 22 using the joint beamforming vector.

Example A2. The network node 16 of Example A1, wherein the network node 16 and/or the radio interface 62 and/or the processing circuitry 68 is further configured to select at least one of a joint channel quality indicator (CQI) and joint modulation and coding scheme (MCS) for the broadcasting of the data to the plurality of wireless devices 22.

Example A3. The network node 16 of Example A1, wherein the network node 16 and/or the radio interface 62 and/or the processing circuitry 68 is further configured to ensure that the selected joint beamforming vector is not in a null space of any one of the individual beamforming vectors.

Example A4. The network node 16 of Example A1, wherein the network node 16 and/or the radio interface 62 and/or the processing circuitry 68 is further configured to restrict precoding matrices that are selectable at the plurality of wireless devices 22 to rank 1 precoding matrices.

Example B1. A method implemented in a network node 16 configured to communicate with a plurality of wireless devices 22, the method comprising: receiving an individual beamforming vector from each of the plurality of wireless devices 22; selecting a joint beamforming vector for broadcasting data to the plurality of wireless devices 22, the joint beamforming vector being based at least in part on each of the individual beamforming vectors; and causing broadcasting of data to the plurality of wireless devices 22 using the joint beamforming vector.

Example B2. The method of Example B1, further comprising selecting at least one of a joint channel quality indicator (CQI) and joint modulation and coding scheme (MCS) for the broadcasting of the data to the plurality of wireless devices 22.

Example B3. The method of Example B1, further comprising ensuring that the selected joint beamforming vector is not in a null space of any one of the individual beamforming vectors.

Example B4. The method of Example B1, further comprising restricting precoding matrices that are selectable at the plurality of wireless devices 22 to rank 1 precoding matrices.

Example C1. A wireless device 22 configured to communicate with a network node 16, the wireless device 22 configured to, and/or comprising a radio interface 62 and/or processing circuitry 68 configured to: cause transmission of an individual beamforming vector to the network node 16; and receive broadcast data that is communicated to the wireless device 22 using a joint beamforming vector, the joint beamforming vector being based at least in part on the transmitted individual beamforming vector.

Example C2. The wireless device 22 of Example C1, wherein the broadcast data is communicated using a joint channel quality indicator (CQI) and joint modulation and coding scheme (MCS).

Example C3. The wireless device 22 of Example C1, wherein the joint beamforming vector is not in a null space of the transmitted individual beamforming vector.

Example C4. The wireless device 22 of Example C1, wherein the wireless device 22 and/or the radio interface 62 and/or the processing circuitry 68 is configured to: receive an indication of a restriction that restricts selectable precoding matrices to rank 1 precoding matrices; and select a precoding matrix of rank 1, the transmitted individual beamforming vector being based at least in part on the selected precoding matrix of rank 1.

Example D1. A method implemented in a wireless device 22, the method comprising: causing transmission of an individual beamforming vector to the network node 16; and receiving broadcast data that is communicated to the wireless device 22 using a joint beamforming vector, the joint beamforming vector being based at least in part on the transmitted individual beamforming vector.

Example D2. The method of Example D1, wherein the broadcast data is communicated using a joint channel quality indicator (CQI) and joint modulation and coding scheme (MCS).

Example D3. The method of Example D1, wherein the joint beamforming vector is not in a null space of the transmitted individual beamforming vector.

Example D4. The method of Example D1, further comprising: receiving an indication of a restriction that restricts selectable precoding matrices to rank 1 precoding matrices; and selecting a precoding matrix of rank 1, the transmitted individual beamforming vector being based at least in part on the selected precoding matrix of rank 1.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method performed by a network node, the method comprising:
receiving channel state information, CSI, from each of a plurality of wireless devices;
determining at least one null space based on the received CSI from each of the plurality of wireless devices;
determining a common precoding matrix index, PMI, the common PMI comprising a common beamforming vector which is not in the at least one null space of any one of individual beamforming vectors of the plurality of wireless devices; and
causing a multicast broadcast transmission to the plurality of wireless devices using at least the common PMI.

2. The method of claim 1, further comprising causing transmission of a non-beamformed CSI-reference signal, CSI-RS, signaling to the plurality of wireless devices, the received CSI from each of the plurality of wireless devices being based on the non-beamformed CSI-RS signaling.

3. The method of claim 1, wherein the common PMI is determined to allow for a maximum common MCS at which each of the plurality of wireless devices have a block error rate, BLER, below a target BLER.

4. The method of claim 1, further comprising signaling a restriction to the plurality of wireless devices, the restriction is configured to limit a rank that is indicatable in the CSI reported by each of the plurality of wireless devices.

5. The method of claim 4, wherein the rank is limited to rank-1 PMI.

6. The method of claim 1, further comprising:
generating a plurality of inner products in matrix form of precoders indicated in each CSI received from the plurality of wireless devices; and
selecting one of a row and column from the matrix that avoids the at least one null space, the common PMI being based on the selected one of the row and column from the matrix.

7. The network node of claim 1, further comprising determining a common channel quality indicator, CQI, based at least on the CSI received from each of the plurality of wireless devices, the broadcast transmission to the plurality of wireless devices using at least the common CQI.

8. The method of claim 7, wherein the CSI received from each of the plurality of wireless devices includes a CQI reported by the wireless device; and
the common CQI corresponds to a CQI having a minimum index of CQIs reported by the plurality of wireless devices.

9. The method of claim 8, further comprising mapping the common CQI to an MCS by accounting for resource availability, the MCS corresponding to a common MCS, the multicast transmission to the plurality of wireless devices using at least the common MCS.

10. The method of claim 7, further comprising:
causing transmission of beamformed CSI-RS signaling to the plurality of wireless devices, the beamformed CSI-RS signaling being based on the common PMI;
receiving additional CSI from each of the plurality of wireless devices based on the beamformed CSI-RS signaling; and
the determining of the common CQI is further being based at least on the additional CSI, the broadcast transmission to the plurality of wireless devices using the common CQI.

11. The method of claim 1, further comprising determining a common modulation and coding scheme, MCS, based at least on the CSI from each of the plurality of wireless devices, the broadcast transmission to the plurality of wireless devices using at least the common MCS.

12. The method of claim 1, further comprising:
generating a plurality of inner products in matrix form of precoders indicated in each CSI received from each of the plurality of wireless devices;
determining more than one row from the matrix corresponds to the inner product is greater than 0; and
using a scaling factor to estimate a resulting received signal power at each of the plurality of wireless devices, the common PMI being based on the estimate of the resulting received signal power at each of the plurality of wireless devices.

13. The method of claim 12, wherein the scaling factor is an approximate representation of a path gain between the network node and the wireless device.

14. A method performed by a first wireless device, the method comprising:
receiving beamformed channel state information-reference signal, CSI-RS, signaling, the beamformed CSI-RS signaling being communicated based on a common precoding matrix index, PMI, the common PMI comprising a common beamforming vector which is not in any of at least one null space associated with a plurality of wireless devices including the first wireless device;
computing a channel quality indicator, CQI, based on the beamformed CSI-RS signaling; and
indicating the CQI that is based on the beamformed CSI-RS signaling to a network node.

15. The method of claim 14, further comprising receiving signaling to indicate to send only CQI, the computed CQI being performed based on the signaling.

16. The method of claim 14, further comprising receiving a multicast broadcast transmission that uses the common PMI.

17. The method of claim 14, further comprising:
receiving non-beamformed CSI-RS signaling;
computing CSI based on the non-beamformed CSI-RS signaling; and
indicating the CSI to the network node for configuring the beamformed CSI-RS signaling using the common PMI.

18. The method of claim 17, wherein the CSI indicates at least one of a PMI and MCS reported by the wireless device.

19. The method of claim 17, further comprising receiving a restriction configured to limit a rank that is indicatable in the CSI.

20. The method of claim 19, wherein the rank is limited to rank-1 PMI.

21. The method of claim 14, further comprising receiving a data traffic channel that is communicated using a common CQI that is based on the indicated CQI.

22. A network node, comprising:
processing circuitry configured to:
receive channel state information, CSI, from each of a plurality of wireless devices;
determine at least one null space based on the received CSI from each of the plurality of wireless devices;
determine a common precoding matrix index, PMI, the common PMI comprising a common beamforming vector which is not in the at least one null space of any one of individual beamforming vectors of the plurality of wireless devices; and
cause a multicast broadcast transmission to the plurality of wireless devices using at least the common PMI.

23. The network node of claim 22, wherein the processing circuitry is further configured to cause transmission of a non-beamformed CSI-reference signal, CSI-RS, signaling to the plurality of wireless devices, the received CSI from each of the plurality of wireless devices being based on the non-beamformed CSI-RS signaling.

24. A first wireless device, comprising:
- processing circuitry configured to:
  - receive beamformed channel state information-reference signal, CSI-RS, signaling, the beamformed CSI-RS signaling being communicated based on a common precoding matrix index, PMI, that the common PMI comprising a common beamforming vector which is not in any of at least one null space associated with a plurality of wireless devices including the first wireless device;
  - compute a channel quality indicator, CQI, based on the beamformed CSI-RS signaling; and
  - indicate the CQI that is based on the beamformed CSI-RS signaling to a network node.

25. The first wireless device of claim 24, wherein the processing circuitry is further configured to receive signaling to indicate to send only CQI, the computed CQI being performed based on the signaling.

* * * * *